US012746941B2

(12) United States Patent
Vertegaal et al.

(10) Patent No.: US 12,746,941 B2
(45) Date of Patent: Sep. 29, 2026

(54) METHODS AND SYSTEMS FOR MANAGING OUTPUT DEVICES IN A VEHICLE BASED ON PROXEMIC RISK

(71) Applicants: Roeland Petrus Hubertus Vertegaal, Perth Road Village (CA); Zhen Li, Toronto (CA); Aneesh Pradyumna Tarun, Milton (CA); Sean Brian Braley, Orillia (CA)

(72) Inventors: Roeland Petrus Hubertus Vertegaal, Perth Road Village (CA); Zhen Li, Toronto (CA); Aneesh Pradyumna Tarun, Milton (CA); Sean Brian Braley, Orillia (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 328 days.

(21) Appl. No.: 18/235,534

(22) Filed: Aug. 18, 2023

(65) Prior Publication Data

US 2025/0058795 A1 Feb. 20, 2025

(51) Int. Cl.
*G01C 21/36* (2006.01)
*B60K 35/28* (2024.01)
(Continued)

(52) U.S. Cl.
CPC ........... *B60W 60/001* (2020.02); *B60K 35/81* (2024.01); *G01C 21/36* (2013.01); *G06F 17/18* (2013.01);
(Continued)

(58) Field of Classification Search
CPC ......... B60K 35/81; B60K 35/00; G01C 21/36
(Continued)

(56) References Cited

U.S. PATENT DOCUMENTS 8,606,457 B2 12/2013 Odinak
8,818,624 B2 8/2014 Small
(Continued)

FOREIGN PATENT DOCUMENTS

WO 2008018699 A1 2/2008

OTHER PUBLICATIONS

Bruijn, O. and Spence, R. (2000). Rapid Serial Visual Presentation: A space-time trade-off in information presentation. In Proceedings of Advanced Visual Interfaces, AVI'2000. Jul. 1, 2020.
(Continued)

*Primary Examiner* — Ernesto A Suarez

(57) ABSTRACT

Methods and devices for managing output devices in a vehicle are disclosed. Data is obtained representing a sensed position of the first vehicle and a sensed feature in a proximity of the first vehicle. A first probability density function (PDF) is defined based on the obtained data, representing likelihood of a future position of the first vehicle. A second PDF is defined based on the obtained data, representing likelihood related to a proxemic risk presented by the sensed feature. A risk metric is computed representing a likelihood of the proxemic risk to the first vehicle based on an overlap between the first PDF and the second PDF. A useable number of information bits is determined, based on the risk metric. An application is controlled to provide output, via output device(s) of the first vehicle, within the useable number of information bits.

20 Claims, 22 Drawing Sheets

(51) Int. Cl.
*B60K 35/81* (2024.01)
*B60W 60/00* (2020.01)
*G06F 17/18* (2006.01)

(52) U.S. Cl.
CPC ........ *B60K 35/28* (2024.01); *B60K 2360/166* (2024.01); *B60W 2420/00* (2013.01)

(58) Field of Classification Search
USPC ............................................................ 701/26
See application file for complete search history.

(56) References Cited

U.S. PATENT DOCUMENTS

| | | | | |
|---|---|---|---|---|
| 10,336,323 | B2 * | 7/2019 | Feit | B60W 30/09 |
| 2002/0085043 | A1 | 7/2002 | Ribak | |
| 2008/0042813 | A1 | 2/2008 | Wheatley | |
| 2017/0136877 | A1 | 5/2017 | Boss | |
| 2020/0174481 | A1 * | 6/2020 | Van Heukelom | G05D 1/0214 |
| 2022/0051017 | A1 * | 2/2022 | Choi | G06N 3/047 |
| 2022/0390237 | A1 * | 12/2022 | Elgersma | G06F 18/2321 |
| 2025/0058793 | A1 * | 2/2025 | Li | B60W 30/18163 |

OTHER PUBLICATIONS

Kajiwara, S. (2014). Evaluation of driver's mental workload by facial temperature and electrodermal activity under simulated driving conditions. International journal of Automotive technology, 15(1), 65-70. Feb. 14, 2014.

Michail, E., Kokonozi, A., Chouvarda, I., & Maglaveras, N. (2008). EEG and HRV markers of sleepiness and loss of control during car driving. In 2008 30th Annual International Conference of the IEEE Engineering in Medicine and Biology Society (pp. 2566-2569). IEEE. Aug. 20, 2008.

Uchiyama, Y., Kojima, S. I., Hongo, T., Terashima, R., & Wakita, T. (2002). Voice information system adapted to driver's mental workload. In Proceedings of the human factors and ergonomics society annual meeting (vol. 46, No. 22, pp. 1871-1875). Sage CA: Los Angeles, CA: SAGE Publications. Sep. 1, 2002.

Walter Piechulla, Christoph Mayser, Helmar Gehrke and Winfried König. (2003). Reducing drivers' mental workload by means of an adaptive man-machine interface. In Transportation Research Part F: Traffic Psychology and Behaviour, vol. 6, Issue 4, pp. 233-248, ISSN 1369-8478. Sep. 16, 2003.

Zhang, H., Smith, M. R. H., & Witt, G. J. (2006). Identification of Real-Time Diagnostic Measures of Visual Distraction With an Automatic Eye-Tracking System. Human Factors, 48(4), 805-821. Dec. 1, 2006.

* cited by examiner

METHODS AND SYSTEMS FOR MANAGING OUTPUT DEVICES IN A VEHICLE BASED ON PROXEMIC RISK

CROSS-REFERENCE TO RELATED APPLICATIONS

This is the first application for the present disclosure.

BACKGROUND

Many existing vehicles are equipped with an advanced driver assistance system (ADAS) that provides assistance for performing various driving tasks (e.g., navigation, cruise control, parking, lane detection, etc.). A common function performed by the ADAS is to collect data from vehicle sensors (e.g., onboard cameras) and provide the driver with output or warnings of possible risks (e.g., being too close to another object in the environment).

However, many existing approaches to providing feedback to the driver, such as beeping sounds, flashing lights or displaying visual warnings on a dashboard display, may fail to sufficiently inform the driver of the risk and/or may further distract the driver and increase risk.

Accordingly, improvements to detection of risk and/or management of outputs in a vehicle would be useful.

SUMMARY

In various examples, the present disclosure describes methods and systems that enable management of output devices in a vehicle, based on detected proxemic risk.

The present disclosure describes the use of a risk metric (also referred to as an entropy metric, a surprise metric or a cognitive load metric) as a way of quantifying the risk scenario of a vehicle.

The proxemic risk, as represented by the risk metric, may be conveyed to a driver via haptic output (e.g., via haptic unit(s) in the steering wheel and/or driver's seat). The intensity and direction of the proxemic risk may be conveyed by selecting the haptic unit(s) to activate and/or by controlling the frequency and intensity of vibrations.

The risk metric may be represented using bits, and may be used to control the amount of information bits that can be used by applications to output information to the driver (e.g., to control the amount of information displayed in a user interface). This may enable a dynamic user interface that automatically adjusts to the risk scenario of the vehicle, for example reducing driver distraction when the driving task is likely to require greater driver concentration.

In an example aspect, the present disclosure describe a method, at a processing unit of a first vehicle, the method including: obtaining, from one or more sensors, data representing a sensed position of the first vehicle and a sensed feature in a proximity of the first vehicle; defining a first probability density function (PDF) based on the obtained data, the first PDF representing likelihood of a future position of the first vehicle; defining a second PDF based on the obtained data, the second PDF representing likelihood related to a proxemic risk presented by the sensed feature; computing a risk metric representing a likelihood of the proxemic risk to the first vehicle based on an overlap between the first PDF and the second PDF; and determining a useable number of information bits, based on the risk metric, for providing output from an application executed by the processing unit; and controlling the application to provide output, via one or more output devices of the first vehicle, within the useable number of information bits.

In an example of the preceding example aspect of the method, the first PDF may be a 1D Gaussian distribution having a mean defined by an estimated stopping distance of the first vehicle and a standard deviation defined by a variation in speed of the first vehicle.

In an example of any of the preceding example aspects of the method, the sensed feature may be a sensed location of another vehicle in the proximity of the first vehicle, and the second PDF may represent likelihood of a future position of the other vehicle; the second PDF may be a 1D Gaussian distribution having a mean defined by the sensed location of the other vehicle and a standard deviation defined by a variation in relative distance between the first vehicle and the other vehicle; and the risk metric may be computed based on an area of the overlap between the first PDF and the second PDF.

In an example of some of the preceding example aspects of the method, the first vehicle may be moving within a lane, the sensed feature may be a sensed boundary of the lane, and the second PDF may represent a distribution of safe trajectories within the lane; the second PDF may be a 1D Gaussian distribution having a mean defined by a midpoint of a width of the lane; and the risk metric may be computed based on a complement of the overlap between the first PDF and the second PDF.

In an example of the preceding example aspect of the method, the standard deviation of the second PDF may be defined based on data about historical safe trajectories associated with the lane.

In an example of any of the preceding example aspects of the method, the risk metric may be computed using a binary logarithm and the risk metric may be represented using bits.

In an example of the preceding example aspect of the method, the useable number of information bits may be determined by subtracting the risk metric in bits from a maximum permitted number of information bits assigned to the application.

In an example of any of the preceding example aspects of the method, a user interface of the application may be outputted by a display device of the first vehicle, and the user interface may be controlled to display a number of user interface elements dependent on the useable number of information bits.

In an example of some of the preceding example aspects of the method, the application may be a messaging application, and the messaging application may be controlled to output a received message, via a visual output device of the first vehicle, at a speed dependent on the useable number of information bits.

In an example of some of the preceding example aspects of the method, the application may be a map application, and the map application may be controlled to provide a visual map at a scale dependent on the useable number of information bits.

In an example of some of the preceding example aspects of the method, the application may be a music application, and the music application may be controlled to output music at a volume dependent on the useable number of information bits.

In an example of some of the preceding example aspects of the method, the application may be a phone application, and the phone application may be controlled to permit or block a call dependent on the useable number of information bits.

In an example of any of the preceding example aspects of the method, the method may further include: outputting the risk metric via at least one of the one or more output devices.

In an example of any of the preceding example aspects of the method, the method may further include: storing the risk metric in a driver profile.

In an example of any of the preceding example aspects of the method, the method may further include: using a navigation application to generate a possible route to a planned destination; communicating with a database storing risk metrics associated with other vehicles along the possible route; computing a risk metric associated with the possible route, using the risk metrics associated with other vehicles along the possible route; and displaying the possible route together with the risk metric associated with the possible route.

In an example of any of the preceding example aspects of the method, the one or more sensors may include at least one of: a camera unit, a radar unit, a global navigation satellite system (GNSS) unit, a LIDAR unit or an ultrasound unit.

In an example of any of the preceding example aspects of the method, the application may be restricted to providing output using only a designated output device when the risk metric exceeds a risk threshold or when the useable number of information bits falls below a minimum threshold.

In an example of some of the preceding example aspects of the method, the application may be prohibited from providing any output via the one or more output devices when the risk metric exceeds a risk threshold or when the useable number of information bits falls below a minimum threshold.

In some examples, the present disclosure describes an electronic device including: a processing unit; and a memory including instructions that, when executed by the processing unit, cause the electronic device to perform any of the preceding example aspects of the method.

In some examples, the present disclosure describes a non-transitory computer readable medium having machine-executable instructions stored thereon. The instructions, when executed by an electronic device, cause the electronic device to perform any of the preceding example aspects of the method.

In some examples, the present disclosure describes a processing module configured to control an electronic device to cause the electronic device to carry out any of the preceding example aspects of the method.

In some examples, the present disclosure describes a system chip comprising a processing unit configured to execute instructions to cause an electronic device to carry out any of the preceding example aspects of the method.

In some examples, the present disclosure describes a computer program characterized in that, when the computer program is run on a computer, the computer is caused to execute any of the preceding example aspects of the method.

BRIEF DESCRIPTION OF THE DRAWINGS

Reference will now be made, by way of example, to the accompanying drawings which show example embodiments of the present application, and in which.

DETAILED DESCRIPTION

Figure 1A:
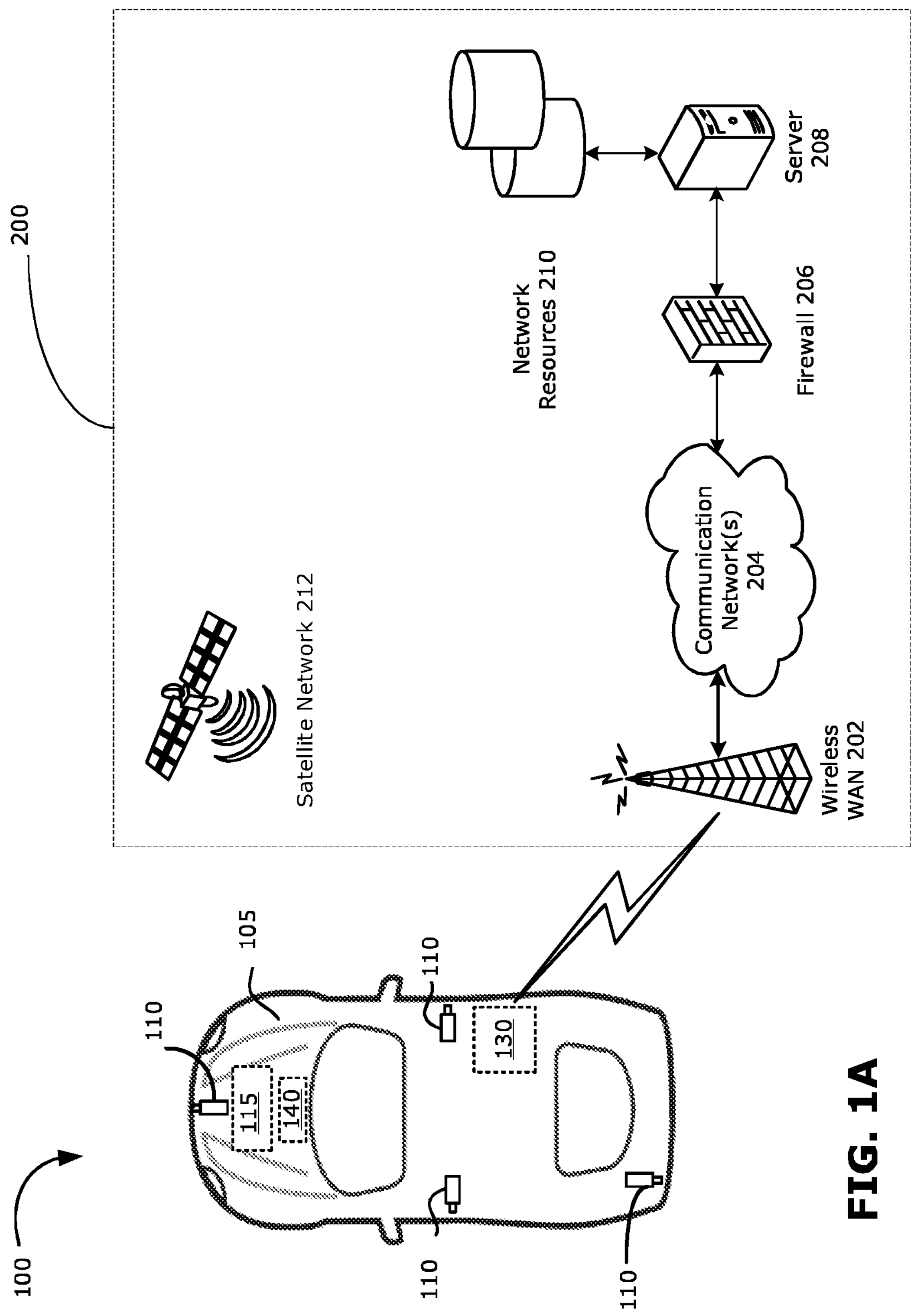
FIGS. 1A and 1B illustrate an example vehicle and its environment, in accordance with examples of the present disclosure.

In various examples, the present disclosure describes methods and systems for management of proxemic risk in a vehicle. Some examples of the present disclosure describe a mechanism for management of proxemic risk by conveying proxemic risk to a driver of the vehicle through haptic output. Some examples of the present disclosure describe a mechanism for management of proxemic risk by conveying proxemic risk to the driver through modifications to the user interface rendered on an in-vehicle display. It should be understood that examples disclosed herein may be implemented in combination, and the present disclosure encompasses various combinations of the disclosed examples.

Some examples of the present disclosure are described in the context of vehicles having an advanced driver assistance system (ADAS). However, it should be understood that the present disclosure is also applicable to vehicles that are not equipped with ADAS (e.g., may be applicable to any vehicle that has capabilities for providing haptic output to a driver and/or for providing an in-vehicle digital display). Although examples described herein may refer to a car as the vehicle, the teachings of the present disclosure may be implemented in other forms of vehicles including, for example, trams, subways, trucks, buses, surface and submersible watercraft and ships, aircraft, warehouse equipment, construction equipment, farm equipment, and other such vehicles.

Generally, during a driving task, various risk conditions might arise in directions surrounding a driver's vehicle. However, the driver's visual attention may be mostly occupied by the driving task. As such, a drivers might neglect a proxemic risk due to a limited field of view (FOV), the driver's current cognitive load (e.g., the driver being engaged with the in-vehicle display) and/or inattentiveness, among other reasons. In the present disclosure, the term proxemic risk is intended to refer to a possible undesirable condition (e.g., a collision) that may happen in the near future (e.g., within the next second or next few seconds) due to the environment in the proximity of the vehicle (e.g., due to other vehicles, due to road curvature, etc.). In some examples, a goal of managing proxemic risk, for example by conveying the proxemic risk to the driver in various ways as disclosed herein, is to help the driver to reduce the risk and avoid the undesirable condition.

Existing methods to convey real-time risk information to the driver are limited. A challenge with existing methods of conveying risk is that many existing methods, such as beeping sounds, flashing lights or rendering graphic illustrations of risk on an in-vehicle display, may not be sufficiently informative to convey detailed information of a risk and/or may further distract the driver and increase risks. Additionally, it is generally desirable to convey the risk information in a way that does not impede the driving task (e.g., does not occupy significantly add to the driver's visual or auditory load) and does not distract the driver.

There has been some exploration of using haptic output (e.g., vibrating motors mounted in a driver's seat) to convey information to a driver. However, existing methods of providing haptic feedback to a driver have drawbacks. For example, an existing solution that uses the tilting angle of the driver's seat as the sole source of haptic feedback might introduce additional distractions to the driver, especially when there is a high risk of collision. Another existing solution that uses three columns of vibration motors in the driver's seat to represent vehicles in the left lane, the driver's lane, and right lane may convey limited information about the actual collision risks and/or may distract the driver due to potential false positive warnings in a busy traffic.

Many existing solutions fail to provide information to the driver about the risk intensity or direction of the risk. There may also be a lack of consistency in conveying information about different risk types. For example, existing solutions might assign different vibrating intensities, frequencies and durations for risks associated with oncoming vehicles, following vehicles, vehicles in adjacent lanes, dangerous curves ahead, or depending vehicle categories. Such haptic feedback may be non-intuitive to a human driver and thus less likely to help the driver to avoid or reduce the risk.

Another approach to help the driver to manage risk is to adjust the in-vehicle user interface automatically to reduce the manual input load of the driver. For example, some existing solutions automatically block telephone calls to the driver when the vehicle is in motion. Other solutions may use heart rate variability (e.g., sensed by heart rate monitor), eye tracking (e.g., using eye tracking cameras) or facial temperature and electrodermal activity (e.g., using dermal sensors) to assess the driver's cognitive load or stress. Some solutions use computer models to estimate the driver's cognitive load or degree of attention in various conditions and adjust in-vehicle displays on this basis.

Drawbacks of such solutions for controlling an in-vehicle display include the reliance on broad statistics (e.g., based on a database of past drivers) or empirical rule-based guidelines based on the vehicle's state (e.g., speed, acceleration etc.). Such solutions suffer from limited consistency and may not provide sufficient real-time risk information to the driver because the actual environment of the vehicle is not taken into account.

Examples of the present disclosure may help to address at least some drawbacks of existing solutions.

Figure 1B:
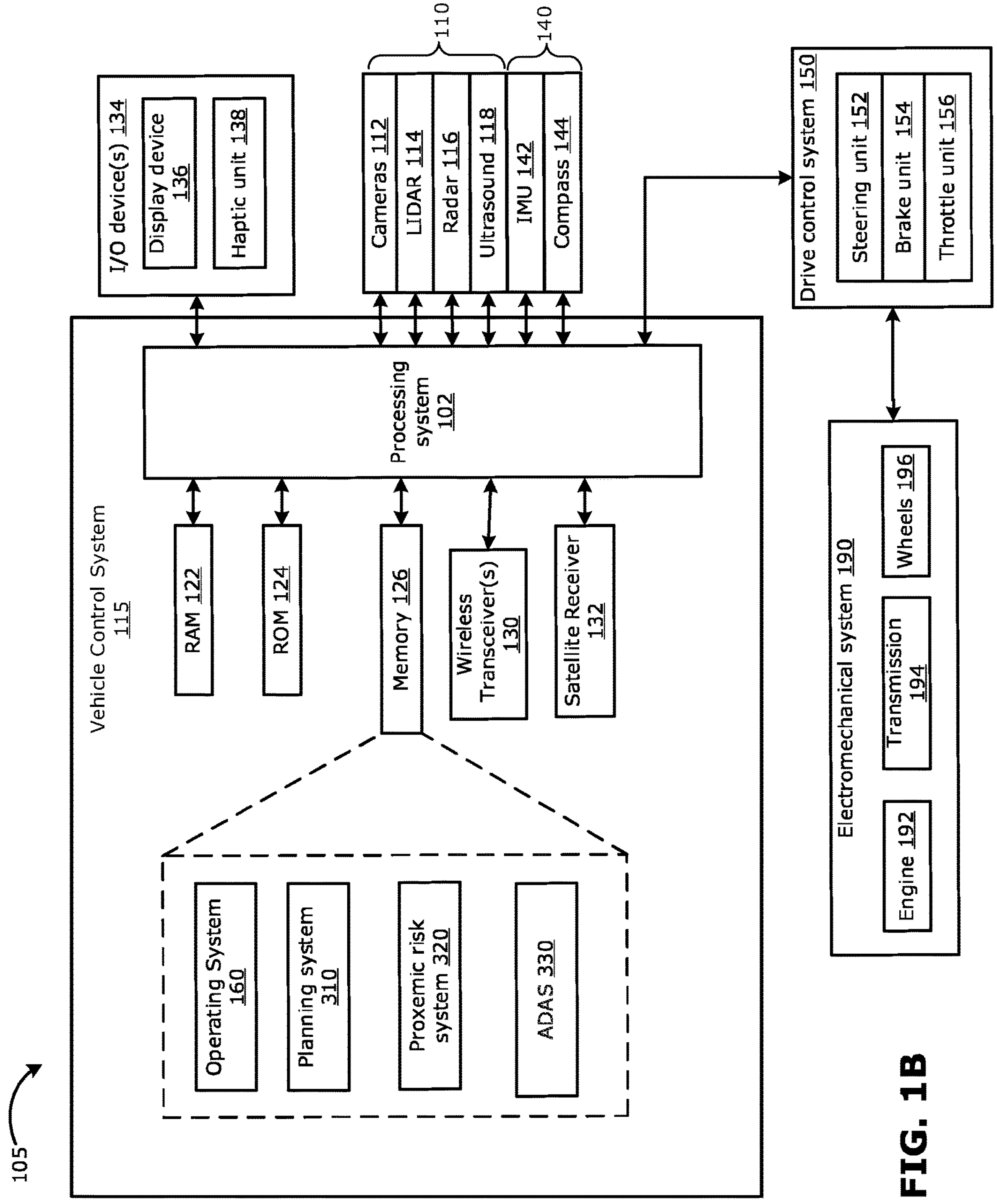

To assist in understanding the present disclosure, FIGS. 1A and 1B are described first.

FIG. 1A is a schematic diagram showing an example environment 100 in which a vehicle 105 operates. Examples of the present disclosure may be implemented in the vehicle 105, for example to convey information about proxemic risk via haptic output and/or an in-vehicle display. The environment 100 includes a communication system 200 that communicates with the vehicle 105. The vehicle 105 includes a vehicle control system 115. The vehicle control system 115 will be described further below with reference to FIG. 1B. In some examples, the vehicle control system 115 may be coupled to a drive control system and/or electromechanical system of the vehicle 105, to enable the vehicle 105 to be operable in a semi-autonomous or fully-autonomous mode (in addition a fully user-controlled mode).

The vehicle 105 may include one or more sensors, shown here as a plurality of environment sensors 110 that collect information about the external environment 100 surrounding the vehicle 105 and generate sensor data indicative of such information. The sensors of the vehicle may further include one or more vehicle sensors 140 that collect information about the operating conditions of the vehicle 105 and generate sensor data indicative of such information. There may be different types of environment sensors 110 to collect different types of information about the environment 100, as discussed further below. In some examples, the environment sensors 110 are mounted to and located at the front, rear, left side and right side of the vehicle 105 to collect information about the external environment 100 located in front, rear, left side and right side of the vehicle 105. Individual units of the environment sensors 110 may be mounted or otherwise located on the vehicle 105 to have different overlapping or non-overlapping FOVs or coverage areas to capture data about the environment 100 surrounding the vehicle 105. The vehicle control system 115 receives sensor data indicative of collected information about the external environment 100 of the vehicle 105 as collected by the environment sensors 110.

The vehicle sensors 140 provide sensor data indicative of collected information about the operating conditions of the vehicle 105 to the vehicle control system 115 in real-time or near real-time. For example, the vehicle control system 115 may determine a linear speed of the vehicle 105, angular speed of the vehicle 105, acceleration of the vehicle 105, engine RPMs of the vehicle 105, transmission gear and tire grip of the vehicle 105, among other factors, using sensor data indicative of information about the operating conditions of the vehicle 105 provided by one or more of the vehicle sensors 140.

Optionally, the vehicle control system 115 may include or be coupled to one or more wireless transceivers 130 that enable the vehicle control system 115 to communicate with a communication system 200. For example, the wireless transceiver(s) 130 may include one or more cellular transceivers for communicating with a plurality of different radio access networks (e.g., cellular networks) using different wireless data communication protocols and standards. The wireless transceiver(s) 130 may communicate with any one of a plurality of fixed transceiver base stations of a wireless wide area network (WAN) 202 (e.g., cellular network) within its geographic coverage area. The one or more wireless transceiver(s) 130 may send and receive signals over the wireless WAN 202. The one or more wireless transceivers 130 may include a multi-band cellular transceiver that supports multiple radio frequency bands. The vehicle control system 115 may use the wireless WAN 202 to access a server 208, such as a driving assist server, via one or more communications networks 204, such as the Internet. The server 208 may be implemented as one or more server modules in a data center and is typically located behind a firewall 206. The server 208 may be connected to network resources 210, such as supplemental data sources that may provide information to be used by the vehicle control system 115.

The wireless transceiver(s) 130 may also include a wireless local area network (WLAN) transceiver for communicating with a WLAN (not shown) via a WLAN access point (AP). The WLAN may include a WiFi wireless network or other wireless communication protocol. The wireless transceiver(s) 130 may also include a short-range wireless transceiver, such as a Bluetooth transceiver, for communicating with a mobile computing device, such as a smartphone or tablet. The wireless transceiver(s) 130 may also include other short-range wireless transceivers including but not limited to near field communication (NFC), ultrawide band (UWB) communication, Z-Wave, ZigBee, ANT/ANT+ or infrared (e.g., Infrared Data Association (IrDA) communication), among others.

The communication system 200 may include a satellite network 212 including a plurality of satellites. The vehicle control system 115 may use signals from the plurality of satellites in the satellite network 212 to determine its position. For example, the satellite network 212 may be part of a global navigation satellite system (GNSS) that provides geo-spatial positioning with global coverage. For example, the satellite network 212 may be a constellation of GNSS satellites. Example GNSSs include the NAVSTAR Global Positioning System (GPS) or the GLObal NAvigation Satellite System (GLONASS), for example.

FIG. 1B illustrates selected components of the vehicle 105 in accordance with some examples described herein. The vehicle 105 includes a vehicle control system 115 that may be coupled to a drive control system 150 and/or an electromechanical system 190, to enable the vehicle 105 to operate in a fully-autonomous or semi-autonomous mode. In some examples, the vehicle control system 115 may only provide driver assistance (e.g., provide outputs conveying a proxemic risk), without controlling physical functions of the vehicle 105. The vehicle control system 115 is also coupled to receive data from the environment sensors 110 and the vehicle sensors 140.

The environment sensors 110 may, for example, include one or more camera units 112, one or more light detection and ranging (LIDAR) units 114, one or more radar units 116, and one or more ultrasound units 118, among other possibilities. Each type of sensor unit 112, 114, 116, 118 may collect respective different information about the environment 100 external to the vehicle 105, and may provide sensor data to the vehicle control system 115 in respective formats. For example, a camera unit 112 may provide camera data representative of a digital image, a LIDAR unit 114 may provide a two or three-dimensional point cloud, the radar unit 116 may provide radar data representative of a radar image, and the ultrasound unit 118 may provide ultrasonic data.

The vehicle sensors 140 may include, for example, an inertial measurement unit (IMU) 142 that senses the vehicle's 105 specific force and angular rate and that provides data about an orientation of the vehicle based on the sensed specific force and angular rate. The vehicle sensors 140 may also include an electronic compass 144, and other vehicle sensors (not shown) such as a speedometer, a tachometer, wheel traction sensor, transmission gear sensor, throttle and brake position sensors, and steering angle sensor, among other possibilities.

The vehicle control system 115 may also collect information about a position of the vehicle 105 using signals received from the satellite network 212, via a satellite receiver 132 (also referred to as a GPS receiver) and generate positioning data representative of the position of the vehicle 105. In some examples, in addition to or instead of using information from the satellite receiver 132 to determine the position of the vehicle 105, the vehicle control system 115 may store a previously-generated high-definition (HD) map and may determine the position of the vehicle 105 by referencing information in the HD map with information from the environment sensors 110.

The vehicle 105 also comprises various structural elements such as a frame, doors, panels, seats, windows, mirrors and the like that are known in the art but that have been omitted from the present disclosure to avoid obscuring the teachings of the present disclosure. The vehicle control system 115 includes a processing system 102 that is coupled to a plurality of components via a communication bus (not shown) which provides a communication path between the components and the processing system 102. The processing system 102 may include one or more processing units, including for example one or more central processing units (CPUs), one or more graphical processing units (GPUs), one or more tensor processing units (TPUs), and other processing units. The processing system 102 is coupled to the drive control system 150, a Random Access Memory (RAM) 122, a Read Only Memory (ROM) 124, a persistent (non-volatile) memory 126 such as flash erasable programmable read only memory (EPROM) (flash memory), the wireless transceiver(s) 130, the satellite receiver 132, and one or more input/output (I/O) devices 134 (e.g., touchscreen, speaker, microphone, display screen, mechanical buttons, etc.).

In some examples, the I/O devices 134 may include a display device 136 that may be integrated with the vehicle 105, such as a dashboard-mounted display that enables display of a user interface (UI) that a driver may interact with to control functions of the vehicle 105 (e.g., to control an entertainment system of the vehicle 105, to interact with a navigation system, etc.), to obtain information about the operation of the vehicle 105 (e.g., to view an odometer, speedometer, etc.) and/or to obtain other information (e.g., to view a weather forecast, to view a map, etc.). Other embodiments of the display device 136 may be possible within the scope of the present disclosure. The I/O devices 134 may also include one or more haptic units 138 (e.g., one or more actuators such as vibration motors) that may be integrated with the vehicle 105.

The drive control system 150 provides control signals to the electromechanical system 190 to effect physical control of the vehicle 105. When in fully-autonomous or semi-autonomous driving mode, for example, the drive control system 150 receives a planned action (e.g., generated using a planning system 310) from the vehicle control system 115 and translates the planned action into control signals using a steering unit 152, a brake unit 154 and a throttle (or acceleration) unit 156. If the vehicle 105 is operating in semi-autonomous or fully user-controlled mode, inputs to the drive control system 150 may be manual inputs (e.g., provided by the driver operating a steering wheel, accelerator pedal, brake pedal, etc.). Each unit 152, 154, 156 may be implemented as software module(s) or control block(s) within the drive control system 150. The drive control system 150 may include additional components to control other aspects of the vehicle 105 including, for example, control of turn signals and brake lights.

The electromechanical system 190 receives control signals from the drive control system 150 to operate the electromechanical components of the vehicle 105. The electromechanical system 190 effects physical operation of the vehicle 105. The electromechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

The memory 126 of the vehicle control system 115 has stored thereon software instructions that are executable by one or more processing units of the processing system 102. The software instructions may be executed by the processing system 102 to implement one or more software systems, software subsystems, and software modules. Generally, it should be understood that software systems, software subsystems, and software modules disclosed herein may be implemented as a set of computer-readable instructions stored in the memory 126. For example, the memory 126 may include executable instructions for implementing an operating system 160, the planning system 310, a proxemic risk system 320 and an ADAS 330. The memory 126 may also have stored thereon instructions for implementing other software systems, subsystems, and modules, for example a navigation module, a climate control module, an entertainment module, a telephone module and/or a messaging module, among other possibilities.

In some examples, the planning system 310 provides path planning (e.g., including mission planning, behavior planning and motion planning) for the vehicle 105. For example, the planning system 310 may generate planned actions to be performed by the vehicle 105 (e.g., by communicating the planned actions to the drive control system 150), to enable the vehicle 105 to operate in fully-autonomous or semi-autonomous mode. In examples where the vehicle 105 does not have fully-autonomous or semi-autonomous capabilities, the planning system 310 may be omitted. In examples where the planning system 310 is present in the vehicle control system 115, the proxemic risk system 320 and/or ADAS 330 may be provided as part of the planning system 310 (or vice versa).

In the present disclosure, the vehicle 105 in which the proxemic risk system 320 and the ADAS 330 are implemented may be referred to as the ego vehicle, to distinguish from other vehicles in the environment 100 (although it should be noted that other vehicles in the environment 100 may also be equipped with their own instances of the proxemic risk system and/or ADAS, etc.). In general, references to the vehicle 105 should be understood to refer to the ego vehicle 105; other vehicles in the environment 100 may be referred to as other vehicles or non-ego vehicles.

Sensor data received from the environment sensors 110 and vehicle sensors 140 (and optionally also positioning data received via the satellite receiver 132) may be used by the ADAS 330 to perform perception functions, including interpreting sensor data to reconstruct certain features of interest about the environment 100 and to determine a state of the vehicle 105. Output from the ADAS 330 may be used by the proxemic risk system 320, as discussed further below. In some examples, perception functions (e.g., as described below) may be performed by a perception system instead of or in addition to the ADAS 330. That is, the present disclosure is not intended to be limited to embodiments that require the use of the ADAS 330.

It should be understood that the ADAS 330 may be any ADAS that is typically found in state-of-the-art cars. An example ADAS 330 is now described, which is not intended to be limiting. The ADAS 330 may perform sensor fusion, which combines information extracted from different sensor data. Sensor data that is inputted to the ADAS 330 may include data from the camera unit 112, the LIDAR unit 114, the radar unit 116 and/or the ultrasound unit 118. The camera unit 112 generates color image data that may be used for road detection and on-road object detection. The radar unit 116 generates radar data that may be used for short and long range distance estimation to objects in the environment 100. The LIDAR unit 116 generates point cloud data containing sparse 3D points representing reflected light from objects in the environment 100. The ultrasound unit 118 generates ultrasound data that may be used for close range distance measurement, such as in parking scenarios. Sensor fusion enables data from these different sensors 112, 114, 116, 118 to be combined in an intelligent way, to provide a richer and more complete understanding of the environment 100 around the vehicle. Various techniques may be used by the ADAS 330 to perform sensor fusion, such as feature-level fusion (e.g., associating features extracted from color image data with a 3D point in a point cloud) and/or decision-level fusion (e.g., using two separate classifiers trained on camera data and LIDAR data respectively).

The ADAS 330 may also use data from the satellite receiver 132 (e.g., GPS data) and/or sensor data from the vehicle sensors 140 (e.g., the IMU 142) to estimate the location and pose (also referred to as the orientation) of the vehicle 105 within the environment 100.

The ADAS 330 may also perform behavior planning and trajectory prediction. In some examples, the ADAS 330 may cooperate with the planning system 310 (or may be part of the planning system 310) to perform such functions. Behavior planning involves generating behavior decisions to ensure the vehicle 105 follows defined driving rules (e.g., following safe driving rules, obeying traffic signs, etc.). Trajectory prediction involves generating a predicted trajectory of the vehicle 105 over a defined prediction horizon in time. In some examples, the ADAS 330 may use model predictive control (MPC) for trajectory and vehicle motion prediction.

The ADAS 330 may output a current state of the vehicle 105, which includes data representing the current operation of the vehicle 105. The current state of the vehicle 105 may also include estimated or predicted data, such as the predicted trajectory of the vehicle 105. For example, the current state of the vehicle 105 may include linear speed, angular speed, linear acceleration, angular acceleration, location (e.g., relative to a GPS frame of reference), pose (e.g., pitch, yaw and roll), and predicted trajectory, among others.

The ADAS 330 may output data, such as a 3D map (or other data structure), representing the environment 100 in the proximity of the vehicle 105 and the state of the vehicle 105 within the environment 100. The output from the ADAS 330 may be provided to the proxemic risk system 320. The proxemic risk system 320 may obtain other inputs, such as a 3D model of the vehicle 105 (e.g., defined or pre-programmed by the manufacturer of the vehicle 105), and vehicle control signals (e.g., from the drive control system 150). It should be understood that the data representing the environment 100 around the vehicle 105 may be time-dependent data, because the environment 100 may be a dynamic environment (e.g., including other moving vehicles, moving pedestrians, changes in the road as the vehicle 105 is moving, etc.). Thus, the data representing the environment 100 may be obtained by the proxemic risk system 320 over a series of timesteps, in real-time or near real-time (e.g., at 100 ms intervals or faster).

In some examples, the ADAS 330 may use information from a pre-stored HD map (e.g., previously generated and stored by the vehicle control system 115) together with sensor data from the environment sensors 110 to perform localization of the vehicle 105 within the environment 100 as represented by the HD map. For example, the ADAS 330 may perform fusion of sensor data, as discussed above, and then reference the fused data with the HD map to localize the vehicle 105 in the context of the HD map. The reconstruction of the environment 100 and localization of the vehicle 105 relative to the HD map may enable the ADAS 330 to provide a more accurate 3D map to the proxemic risk system 320.

The proxemic risk system 320, when executed, generates a risk metric (also referred to as an entropy metric, surprise metric or cognitive load metric) that represents a proxemic risk (i.e., a risk in the proximity of the vehicle 105), which may be conveyed to the driver. For example, a risk metric that exceeds a defined risk threshold may be conveyed to the driver via one or more haptic units 138. In another example, a risk metric that exceeds the defined risk threshold may be conveyed to the driver via changes to the UI of the display device 136.

There may be one or more haptic units 138 positioned in the vehicle 105 at locations selected to enable conveyance of directional information to the driver in a manner that is intuitively understandable by a human driver. For example, a haptic unit 138 integrated into the steering wheel may enable conveyance of information about risks (e.g., as determined by the proxemic risk system 320) from the front of the vehicle 105; a haptic unit integrated into the back of a driver's seat may enable conveyance of information about risks from the rear of the vehicle 105; and haptic units integrated into the side bolsters and/or sides of a driver's seat may enable conveyance of information about risks from either side of the vehicle 105. The use of haptic units 138 to convey proxemic risk information in this way may enable risk information to not only be outputted to the driver, but may enable the risk information to be outputted in a manner that conveys meaning (e.g., the direction of the risk) in an intuitive and/or easily understood way.

Figure 2A:
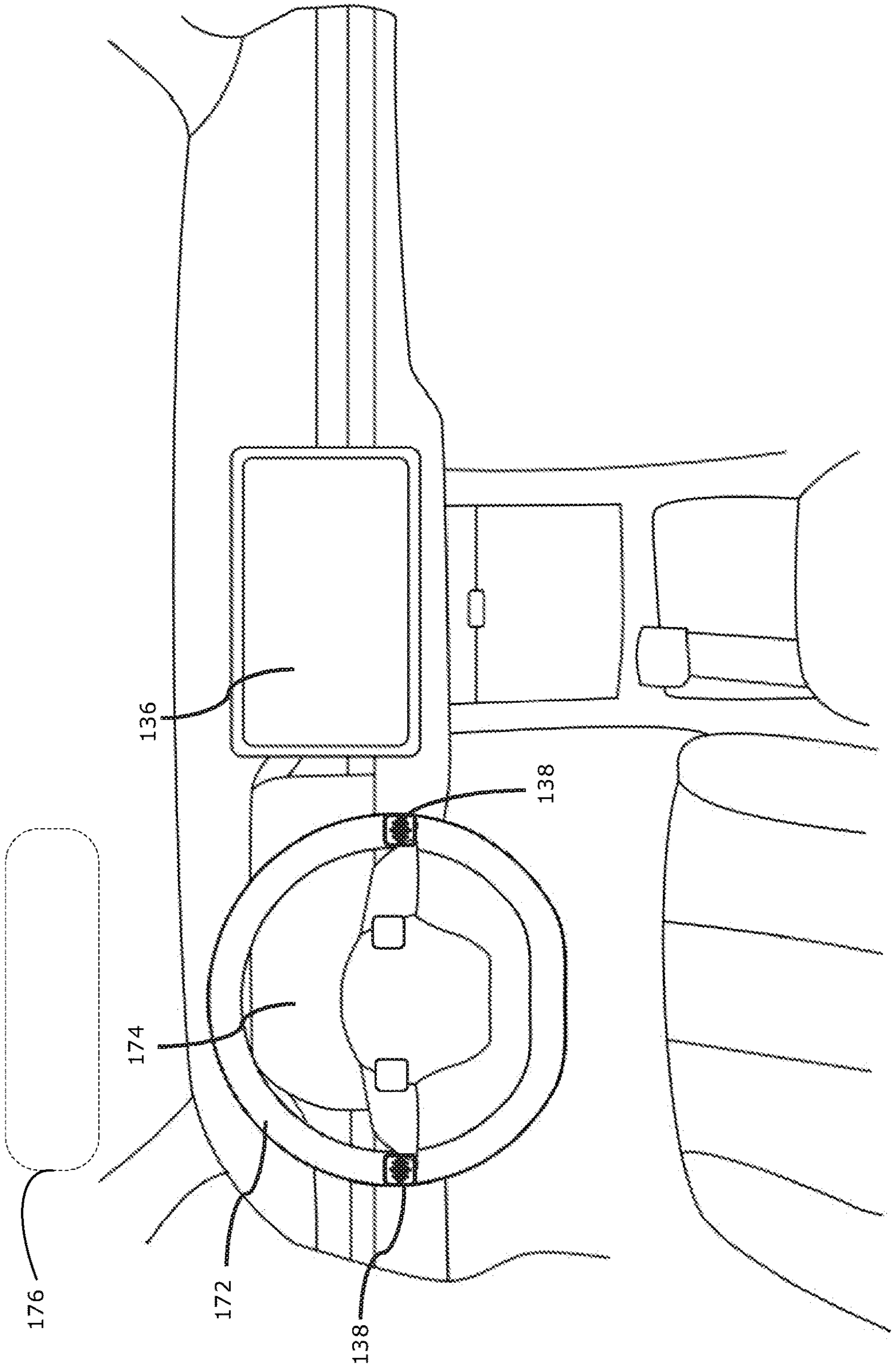
FIGS. 2A and 2B illustrate examples of output devices and haptic units in the example vehicle, in accordance with examples of the present disclosure.

FIG. 2A illustrates an example of how haptic units 138 may be integrated in a steering wheel the vehicle 105, to enable conveyance of risk information to a driver. FIG. 2A includes a steering wheel 172, an instrument panel 174 and the display device 136 (e.g., an in-vehicle infotainment display). Optionally, a head-up display (HUD) 176 may also be provided.

The instrument panel 174 typically provides basic information about the operation of the vehicle 105, such as speed, fuel level, and sensor states. In some examples, some of the information provided by the instrument panel 174 may also be accessible via the display device 136. In some examples, if the instrument panel 174 is equipped with a digital display, some components of a digital UI displayed by the display device 136 may be rendered on the instrument panel 174.

The display device 136 may provide functions of the vehicle's infotainment system. The display device 136 may enable the driver to interact with elements of a UI (e.g., including interacting with menus to control functions of the vehicle 105, interacting with a digital map, etc.). It is generally understood that interactions with the UI on the display device 136 may increase the driver's cognitive load and/or may distract the driver from the driving task. In examples of the present disclosure, the number and/or size of UI components may be modified based proxemic risk determined by the proxemic risk system 320.

The optional HUD 176 may be used to provide information while keeping the driver's gaze to the road in front of the vehicle 105. The HUD 176 typically is smaller in size than the display device 136 and typically is used to provide more concise information. In examples of the present disclosure, selected information about a proxemic risk determined by the proxemic risk system 320 may be provided via the HUD 176.

In this example, two haptic units 138 (e.g., vibration motors or actuators) are located on opposite sides of the steering wheel 172. The location of the haptic units 138 illustrated in FIG. 2A may be useful for conveying information about proxemic risks from the front of the vehicle 105. In some examples, additional haptic feedback may be provided via a slight steering force from the steering wheel 172 (which may be controlled by the drive control system 150) without actually changing the direction of the vehicle 105

Figure 2B:
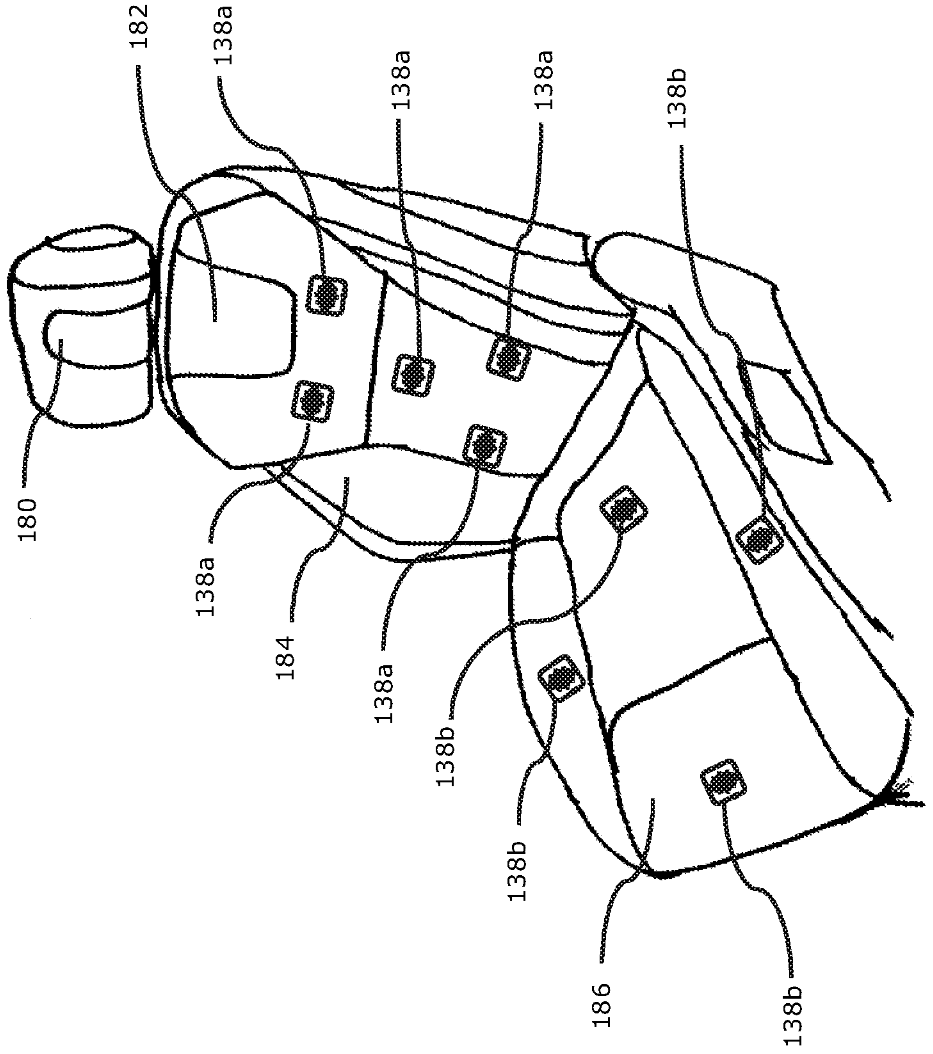

FIG. 2B illustrates an example of how haptic units 138 may be integrated in a driver's seat of the vehicle 105, to enable conveyance of risk information to a driver. The driver's seat in this example includes a head rest 180, a back cushion 182 (in this example, the back cushion 182 includes side bolsters 184) and a seat cushion 186. A first set of haptic units **138*a* may be embedded in the back cushion 182 to enable conveyance of risk from the rear of the vehicle 105. As shown in FIG. 2B, the first set of haptic units 138*a* may include a haptic unit 138*a* located near the center of the back cushion 182 as well as at least one haptic unit 138*a* located towards the left of the back cushion 182 and at least one haptic unit 138*a* located towards the right of the back cushion 182, thus enabling the risk information to be conveyed with more nuanced directionality (e.g., conveying risk from direct rear, from rear-right or rear-left directions). In some examples, at least one haptic unit 138 (not shown in FIG. 2B) may additionally or alternatively be located in each side bolster 184 for conveying information about risks from the sides of the vehicle 105. A second set of haptic units 138***b* may be embedded in the seat cushion 186 to enable conveyance of risk from the sides of the vehicle 105. In this example, no haptic unit 138 is located at the head rest 180, to avoid uncomfortable stimulation of the head.

It should be understood that the vehicle 105 may have haptic units 138 only in the steering wheel (e.g., as shown in FIG. 2A), only in the driver's seat (e.g., as shown in FIG. 2B), or in both the steering wheel and the driver's seat (e.g., FIGS. 2A and 2B may be implemented together in the same vehicle 105). In examples where haptic units 138 are implemented in the steering wheel as well as the driver's seat, the haptic units 138 may be selectively activated in order to convey risks from various directions around the vehicle 105, including from the front, front-right or front-left directions.

Figure 3:
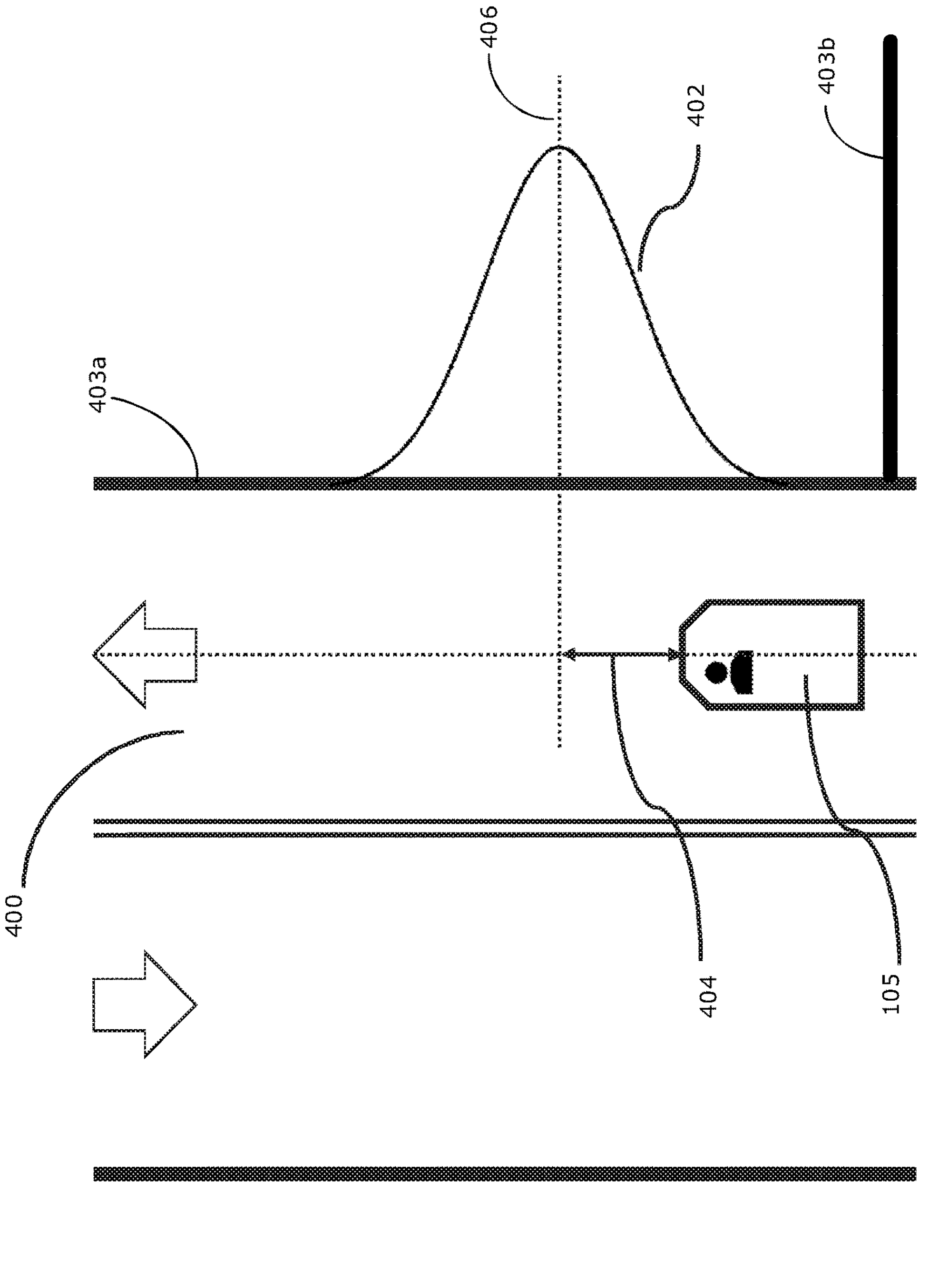
FIG. 3 illustrates an example of a probability density function that may be defined for an ego vehicle, in accordance with examples of the present disclosure.

FIG. 3 illustrates an example of how the proxemic risk system 320 may define a probability distribution for the vehicle 105 (also referred to as the ego vehicle 105) in a simplified traffic scenario. In this example, the ego vehicle 105 is traveling in a lane 400 of traffic. There are no other vehicles detected in the proximity of the ego vehicle 105. A first probability density function (PDF) 402 may be used to represent the likely future position of the ego vehicle 105 in a future timestep (e.g., in the next future timestep (such as 100 ms in the future), or several timesteps in the future (such as 500 ms in the future)). The first PDF 402 may have a Gaussian distribution (also referred to as a normal distribution) with a defined mean and defined standard deviation. However, it should be understood that the first PDF 402 may have a non-Gaussian distribution. The mean 406 of the first PDF 402 may be defined to be a location relative to the current position of the ego vehicle 105. For example, the mean 406 of the first PDF 402 may be defined to be the estimated position of the ego vehicle 105 at the future timestep, for example based on the current vehicle speed and direction (e.g., as determined by the ADAS 330). In another example, the mean 406 of the first PDF 402 may be defined based on the estimated stopping distance 404 of the ego vehicle 105 computed using the current vehicle speed and direction, as well as the current road conditions (e.g., as determined by the ADAS 330). The standard deviation of the first PDF 402 may be defined based on changes in the speed of the ego vehicle 105.

FIG. 3 illustrates the first PDF 402 as a 2D plot with an x-axis 403*a* representing a future position along the current direction of the ego vehicle 105 and a y-axis 403*b* that represents probability. However, it should be understood that the first PDF 402 may be a 3D surface that represents the likely future position of the ego vehicle 105 in multiple directions, or the first PDF 402 may consist of two sub-PDFs (not shown) that represent the likely future position of the ego vehicle 105 in the current direction of travel and in a perpendicular direction (e.g., representing the likelihood that the ego vehicle 105 will change lanes in the future timestep). The first PDF 402 may be normalized such that the total area under the first PDF 402 (or the total volume, in the case where the first PDF 402 is a 3D surface) is equal to one.

FIG. 3 illustrates how the first PDF 402 may be defined in a simple traffic scenario where there are no other vehicles in the proximity of the ego vehicle 105. However, in practice the proxemic risk system 320 may operate to define the first PDF 402 only when the potential for a risk has been detected (e.g., by the ADAS 330), such as when there is another vehicle in the proximity of the ego vehicle 105 or when there is an upcoming curve in the road.

Figure 4:
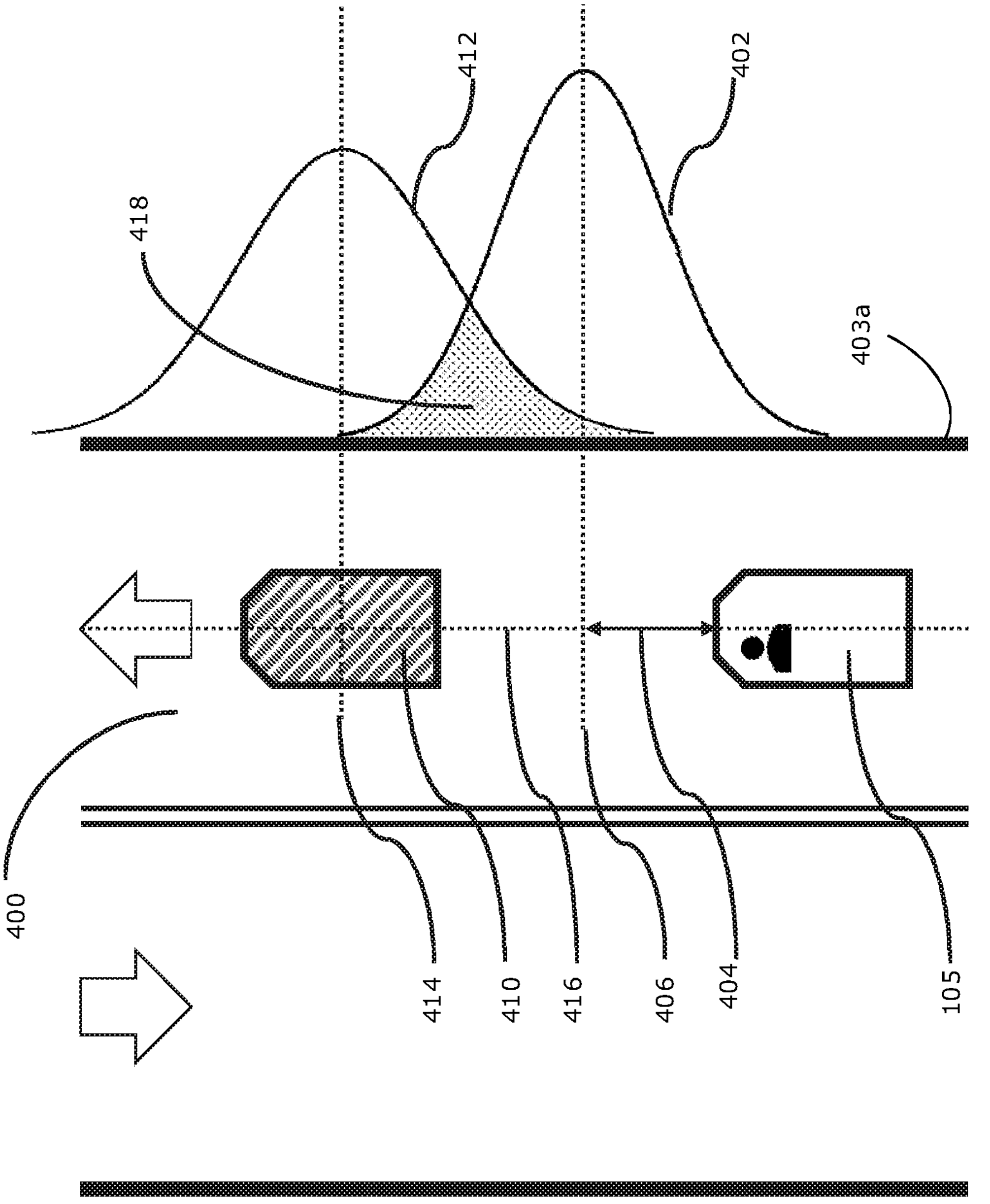
FIG. 4 illustrates example probability density functions that may be defined for an ego vehicle and another vehicle in the same lane in an example where there may be a risk of a collision, in accordance with examples of the present disclosure.

FIG. 4 illustrates an example of how the proxemic risk system 320 may determine a proxemic risk in another traffic scenario, in which there is another vehicle in the same lane as the ego vehicle.

The environment sensors 110 may detect the presence of another vehicle 410 in front of the ego vehicle 105 in the same lane 400. This scenario may represent a potential collision between the front of the ego vehicle 105 and the rear of the other vehicle 410, for example if the speed of the other vehicle 410 is lower than the speed of the ego vehicle 105 or if the other vehicle 410 decelerates. The proxemic risk system 320 may thus be used to determine a proxemic risk due to the other vehicle 410. Similar to the example of FIG. 3, the proxemic risk system 320 may define a first PDF 402 representing the likely future position of the ego vehicle 105, based on the current speed and direction of the ego vehicle 105. The proxemic risk system 320 may use the sensed location and/or velocity of the other vehicle 410 (e.g., determined by the ADAS 330 using data from sensors such as the LIDAR unit 114, radar unit 116, ultrasound unit 118 and/or the camera 112) to define a second PDF 412 representing the likely future position of the other vehicle 410. The second PDF 412 may be defined to have a Gaussian distribution, with a mean based on the sensed location 414 of the other vehicle 410. Sensed changes (e.g., over a few timesteps, every 100 ms, every 100 ms-500 ms, etc.) in the relative position between the ego vehicle 105 and the other vehicle 410 may be used to define the standard deviation of the second PDF 412. Thus, the standard deviation of the second PDF 412 may be time-varying and dynamic. It should be understood that the second PDF 412 may have a non-Gaussian distribution.

In this example, because the other vehicle 410 is in the same lane 400 as the ego vehicle 105, it may be sufficient for the proxemic risk system 320 to determine the first and second PDFs 402, 412 along an axis 416 that is aligned with the direction of the lane 400. The proxemic risk system 320 may compute the overlap 418 between the first and second PDFs 402, 412 (e.g., may compute the area bounded by the first PDF 402, the second PDF 412, and the x-axis 403*a*). The area of the computed overlap 418 may be used to compute a risk metric that represents an amount of risk. Further, the position of the overlap 418 (e.g., the location of the centroid of the overlap 418 along the x-axis 403*a*) may be computed by the proxemic risk system 320 to determine a direction of the risk relative to the ego vehicle 105.

The risk metric may be computed using the following definition (which may also be referred to as the surprise function):

$$S=-\log_2(1-\%\text{ overlap}) \quad \text{Equation 1}$$

where S denotes the risk metric, % overlap denotes the area of overlap 418 relative to the total area of the first PDF 402 (which, if normalized, equals one), and thus the probability of an error (where an "error" in the context of driving may be any undesirable driving event such as a collision with another vehicle). The negative $\log_2$ is the binary logarithm that represents the negative log probability. It may be noted that because this binary logarithm is used to compute the risk metric, this risk metric is therefore representable in bits. It may be recognized that when the % overlap approaches 100%, the value of the risk metric approaches infinity, representing a definite undesirable event such as a collision. However, it should be understood that because the risk metric represents a probability rather than a definite determination, an actual undesirable event (e.g., an actual collision) may occur even when the % overlap is lower.

This calculation can be implemented, in bits, using a KL divergence between two sample probability distributions representing absolute position (and relative velocity) of the other vehicle 410 and the ego vehicle 105, respectively. For example, PDF 412, PDF 402 may each represent a sample of data over a defined time period (e.g., 1 second of data) on the absolute position of each respective vehicle 410, 105, with the variance of each distribution representing the relative velocity between cars. Then the KL divergence may be calculated as follows:

$$D_{KL}(P_{412} \| P_{402}) = \int_{-\infty}^{\infty} P_{412}(x) \frac{P_{412}(x)}{P_{402}(x)} \quad \text{Equation 2}$$

where $P_{412}$ denotes PDF 412, $P_{402}$ denotes PDF 402, and $D_{KL}$ denotes the KL divergence.

It may be noted that Equation 2 is the reciprocal of Equation 1, as the probability is inverse (i.e., value goes down when overlap between PDF 412 and PDF 402 increases). Thus, the result of equation 2 may be understood to represent the probability of avoiding error (e.g., no collision). It may also be noted that the change in velocity between vehicles will be the same when seen from the relative perspective (i.e., represented as the relative distance between cars). This means both PDFs 412, 402 have equal variances, denoted σ. It may also be noted that the relative distance between the PDFs 412, 402 is the mean of PDF 412 (denoted $\mu_1$) minus the mean of PDF 402 (denoted $\mu_2$). Thus, the KL divergence may be more efficiently calculated using the following:

$$S = c\frac{\log_2 e}{2}\left(\frac{\sigma}{\mu_1 - \mu_2}\right)^2 \quad \text{Equation 3}$$

where c is an empirically determined constant, and S denotes the KL divergence.

The σ in equation 3 may be replaced by the notation W and $\mu_1$-$\mu_2$ may be replaced by the notation A, to arrive at the following equation:

$$S = c\frac{\log_2 e}{2}\left(\frac{W}{A}\right)^2 \quad \text{Equation 4}$$

Equations 3 and 4 may be more efficient for practical implementation in the ego vehicle 105, because of the simpler computations and because these equations do not require the absolute positions of either vehicle 410, 105. A is defined by the average relative distance between the ego vehicle 105 and the other vehicle 410 and may be measured using various suitable sensors such as radar-based distance sensors that may be already implemented in the ego vehicle 105. W is the standard deviation of the relative distance, and is related to the relative velocity between the ego vehicle 105 and the other vehicle 410. The empirically derived constant c serves to relate the % overlap to the number of actual undesirable events (e.g., collisions) that occur based on real-world data. In other words, c serves to calibrate the KL divergence to actual collision risk for any value of W/A. Finally, it may be noted that the value W/A may be understood to represent a signal-to-noise ratio (SNR), in particular the SNR of the distance between the two vehicles 410, 105. Conceptually, this SNR may be used to calculate the amount of information, or transfer entropy, that needs to be processed by the driver in order to avoid an error (e.g., a collision).

To calibrate the KL divergence, another, independent, method for calculating the KL divergence between the two vehicles is used, which is based on only relative error rates. This is simply a discretized KL divergence, where an amount of overlap between the PDFs at a given W/A value represents a number of collisions over the total number of collisions, which may be understood to represent the probability of a collision. The number of collisions that occur at a given W/A ratio may be determined from real-world data (e.g., provided by telematics data from real-world vehicles), and/or from simulated data (e.g., using an artificially generated driving environment in a simulator). In this way, the percentage of collisions may be determined for each W/A ratio, given a number of variables such as the physics of the vehicle, the driver's ability, etc. This actual collision probability may be represented using bits by applying a negative log probability, to obtain a value that represents the risk of the driving task at each measured W/A ratio:

$$y(W/A) = -\log_2(1 - \%\ \text{collisions}\ (W/A)) \quad \text{Equation 5}$$

In equation 5, y(.) represents a function that maps the probability of collision to the W/A ratio.

Fitting a regression to the curvature produced by the data samples over a range of W/A provides a quadratic fit with a constant c that represents the calibrated KL divergence for the underlying variables (e.g., vehicle physics, driving capability or age of the drivers, etc.). By sampling data according to selected classifications by car type, weather, driving capability, age and other variables, specific values for the constant c may be derived for specific categories. In some examples, in addition to or instead of sampling data about actual collisions, the sampled data may be from near-collisions, in which vehicles come within a specified range of each other. Using data sampled from near collisions, rather than actual collisions, may enable collection of ground truth data for calibration of the KL divergence that is completely individualized to the specific vehicle. Collection of data from near collisions may be more readily performed on the fly (in real-time) in real-world vehicles.

Equations 1-5 discussed above may be used to model the total amount of information or transfer entropy that needs to be processed by the driver to keep the risk of a collision near zero. However, the amount of processing that can be performed by the driver is limited by a number of variables such as to the foot-eye control of the driver (e.g., in the case of following another vehicle), as well as other parameters relating to the physics of the vehicle, among others. In general, it may be understood that the driver's ability to process information is limited by the driver's control of the limb used to act on the processed information, in relation to the characteristics of the input device (e.g., a brake pedal). It should be noted that the typical information processing bandwidth b (as discussed below with respect to Equation 6) of foot control devices is typically extremely low, meaning that the driver's ability to process transfer entropy is also relatively low (e.g., compared to a hand-operated input device).

The driver performance may be computed using the following equation, which represents the amount of information the driver can process given the SNR represented as the ratio W/A:

$$S = b * \log_2\left(\frac{W}{A} + 1\right) \quad \text{Equation 6}$$

Here, W is defined by the variation in relative distance between the ego vehicle 105 and the other vehicle 410, and A denotes the "amplitude" of the signal, defined as the mean relative distance between the ego vehicle 105 and the other vehicle 410. Again, the performance metric, represented by S, may be represented using bits and may denote the number of information bits processed by the driver for a given a SNR (i.e., a given W/A).

The constant b in Equation 6 represents an empirically derived performance gain that represents the reciprocal of the bandwidth b of input device/limb combination used to control braking/acceleration behaviors (for simplicity, the focus will be on braking only). The value of b can be calibrated by determining the W/A SNR whenever the driver brakes, computing the KL divergence for that W/A, and then computing the KL divergence again when the driver releases the brake. Subtracting these two KL divergence values gives a value that represents the amount of information consumed by the driver between the start of braking and the end of braking. By fitting a logarithmical regression to the consumed information statistics, a bandwidth b can be derived that calibrates driver performance to actual conditions. This bandwidth is in units of W/A per bit of information consumed and its reciprocal is in bits per W/A.

The calibration described above may be performed for individual drivers (e.g., when a vehicle is first driven by a particular driver), averaged over multiple drivers (e.g., in an age category), etc. This calibration is also affected by the physics of the vehicle and other real-world variables (e.g., road conditions). The logarithmic curve can be compared to the calibrated risk metric curve to determine the driver's maximum performance, i.e., where the driver's ability to process information is exceeded by the amount of information that requires processing. This point is where the two curves meet, and where errors (e.g., collisions) will become frequent. This point thus may define a maximum limit on driver performance, which is typically slightly higher than bandwidth b in equation 6. Either bandwidth b or the maximum limit can be used to as a maximum capacity baseline for driver performance, yielding the remaining driver capacity that can be used to process information from and on-board user interface (e.g., as discussed with reference to FIG. 11 below). Additionally or alternatively, equation 6 can directly be used to control the user interface. In many scenarios, and optionally, driver capacity is exceeded just beyond or at a SNR W/A of 1/1. This generalization may enable the use of only W/A as an input metric, without empirical calibration of driver performance (e.g., Equation 6).

The proxemic risk system 320 may be configured to compute the risk metric using any one, some or all of the above definitions. The proxemic risk system 320 may select one definition to use for computing the risk metric, depending on the scenario.

The proxemic risk system 320 may compare the risk metric to a defined risk threshold. If the risk metric exceeds the risk threshold, the proxemic risk system 320 may communicate a risk signal (which may indicate the severity of the risk as well as the direction of the risk) to the ADAS 330, which may in turn control one or more haptic units 138 and/or the display device 136 in order to appropriately convey the proxemic risk to the driver. In some examples, instead of communicating the risk signal to the ADAS 330, the proxemic risk system 320 may directly control one or more haptic units 138 and/or the display device 136.

The haptic unit(s) 138 may be controlled (by the ADAS 330 or the proxemic risk system 320) to activate according to the direction of the determined risk. In this example, the risk is from a frontward direction therefore the haptic unit(s) 138 embedding in the steering wheel 172 may be activated. Additionally, the intensity and/or frequency of the haptic output may be controlled based on the magnitude of the risk metric.

It should be understood that the computation of the risk metric may be similarly performed when another vehicle is detected to the rear of the ego vehicle 105. The difference is that the sensed location of the other vehicle (e.g., sensed using environment sensors 110 such as the LIDAR unit 114, radar unit 116, ultrasound unit 118 and/or the camera 112) would be behind the ego vehicle 105 and the mean of the second PDF representing the likely position of the other vehicle would thus be located behind the ego vehicle 105 instead. When the proxemic risk system 320 computes a risk metric and determines that the risk from the rear of the ego vehicle 105 exceeds a risk threshold, the determined risk may be conveyed to the driver via actuation of haptic units 138 embedded in the driver's seat. For example, the haptic units 138 embedded in the center of the seat cushion 186 and/or center of the back cushion 182 may be activated (with an intensity and/or frequency that may be modulated based on the magnitude of the risk metric), to indicate that the risk is from the rear of the ego vehicle 105.

Figure 5:
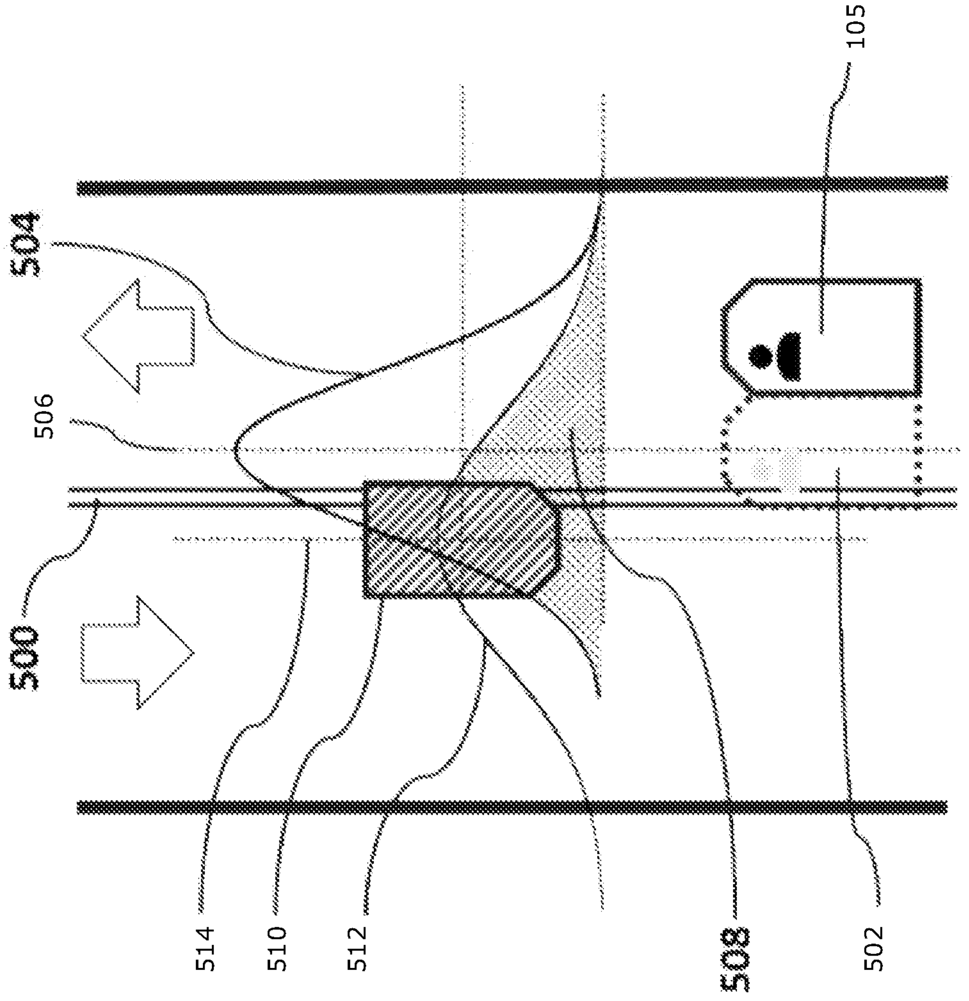
FIG. 5 illustrates example probability density functions that may be defined for an ego vehicle and another vehicle in an oncoming lane in another example where there may be a risk of a collision, in accordance with examples of the present disclosure.

FIG. 5 illustrates an example of how the proxemic risk system 320 may determine a proxemic risk in yet another traffic scenario, in which there is another vehicle in the oncoming lane.

In this scenario, the ego vehicle 105 is at risk of a head-on collision with another vehicle 510 in the oncoming lane. This type of risk may occur when at least one of the vehicles 105, 510 is too close to the lane boundary 500, for example due to distracted driving. The environment sensors 110 (e.g., the LIDAR unit 114, radar unit 116, ultrasound unit 118 and/or camera 112) may sense the location of the other vehicle 510. In some examples, the ADAS 330 may detect that the other vehicle 510 is an oncoming vehicle in the oncoming lane (rather than a vehicle traveling in the same direction in the same lane, as in the example of FIG. 4). Accordingly, the proxemic risk system 320 may be used to determine a proxemic risk due to the oncoming other vehicle 510.

The proxemic risk system 320 uses the sensed location of the other vehicle 510 to define a second PDF 512 representing a likely future position of the other vehicle 510. The proxemic risk system 320 models the risk of head-on collision by estimating a possible future lateral position 502 of the ego vehicle 105 (indicated by the use of a dashed outline in FIG. 5), given the current speed and direction of the ego vehicle 105. The future lateral position 502 of the ego vehicle 105 may be one vehicle-width from the current location of the ego vehicle 105, to represent a possible maximum distance the ego vehicle 105 could travel over a defined time period (e.g., over 100 ms). The proxemic risk system 320 defines a first PDF 504 representing a likely future position of the ego vehicle 105, based on the estimated future position 502 of the ego vehicle 105. It may be noted that, compared to the example of FIG. 4, the first and second PDFs 504, 512 represent likely future positions along an axis that is perpendicular to the direction of travel (i.e., in the lateral direction). This is because, in the case where the risk is a head-on collision with an oncoming vehicle, the lateral position of each vehicle 105, 510 is of concern.

In this example, both the first PDF 504 and the second PDF 512 are Gaussian distributions, although this is not intended to be limiting. The mean of the first PDF 504 is defined based on the estimated future position 502 of the ego vehicle 105. The mean of the second PDF 512 is defined based on the detected current position of the other vehicle 510. In some examples, the mean of the second PDF 512 may be defined based on an estimated future position of the other vehicle 510 (e.g., an estimate of where the other vehicle 510 would be in the next timestep or in the next few seconds, assuming the other vehicle 510 keeps its current speed and direction). The change (e.g., over a few timesteps) in the lateral position of the vehicles 105, 510 is used to define the standard deviations of the respective PDFs 504, 512.

The proxemic risk system 320 computes a risk metric based on the overlap 508 between the first and second PDFs 504, 512 (similar to the procedure described above with respect to the example of FIG. 4). If the risk metric exceeds a defined risk threshold (which may be the same or different from the risk threshold used in the example of FIG. 4), the proxemic risk system 320 may communicate the risk metric to the ADAS 330 in order to convey the proxemic risk using the haptic units 138 and/or display device 136. In some examples the proxemic risk system 320 may directly control the haptic units 138 and/or display device 136 to convey the proxemic risk. In this example, one or more haptic units 138 embedded in the steering wheel 172 may be activated. If haptic units 138 are embedded in the left and right sides of the steering wheel 172, the haptic unit 138 corresponding to the direction of the risk may be activated (e.g., the haptic unit 138 embedded in the left side of the steering wheel 172 may be activated to convey a proxemic risk from the left side of the ego vehicle 105). Additionally or alternatively, one or more haptic units 138 embedded in the driver's seat may be activated. For example, the haptic unit(s) 138 embedded in the left side of the driver's seat may be activated to convey a proxemic risk from the left side of the ego vehicle 105. The intensity and/or frequency of the haptic output may be modulated based on the magnitude of the risk metric, in some examples.

The proxemic risk system 320 continues to use the sensed location of the other vehicle 510 (which may be updated in real-time by the environment sensors 110) to update the mean and standard deviation of the second PDF 512. Similarly, mean and standard deviation of the first PDF 504 may also be updated in real-time as the ego vehicle 105 and the other vehicle 510 continue to travel. In this way, it should be understood that the proxemic risk system 320 processes real-time sensor data in order to define time-varying PDFs 504, 512 in order to more accurately reflect the real-world scenario. The proxemic risk system 320 also updates the risk metric based on the updated overlap 508 between the updated first and second PDFs 504, 512. The updated risk may be continuously conveyed via controlling the haptic units 138 and/or display device 136 in accordance with the risk metric, until the vehicles 105, 510 have completely passed each other and the risk of head-on collision is avoided.

Figure 6:
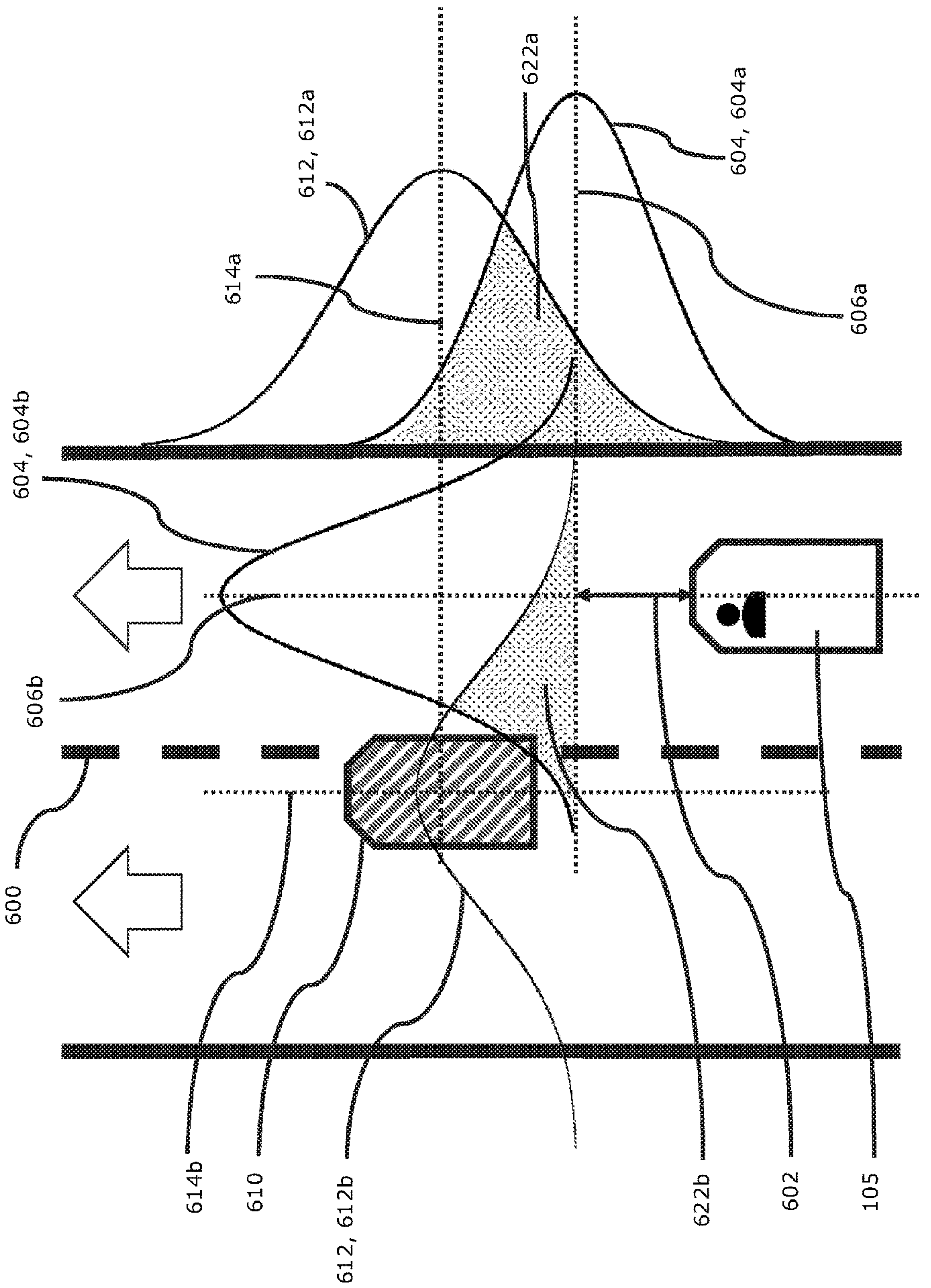
FIG. 6 illustrates example probability density functions that may be defined for an ego vehicle and another vehicle in an adjacent lane in another example where there may be a risk of a collision, in accordance with examples of the present disclosure.

FIG. 6 illustrates an example of how the proxemic risk system 320 may determine a proxemic risk in yet another traffic scenario, in which another vehicle is making a lane change.

In this scenario, the ego vehicle 105 is at risk of a collision with another vehicle 610 that may be moving into the same lane as the ego vehicle 105. This type of risk may occur when the other vehicle 610 starts in a lane adjacent the lane of the ego vehicle 105 and then begins to cross the median separating the two lanes while being too close to the ego vehicle 105 (e.g., while the ego vehicle 105 is in the other vehicle's blind spot). The environment sensors 110 (e.g., the LIDAR unit 114, radar unit 116, ultrasound unit 118 and/or camera 112) may sense the location of the other vehicle 610 and the ADAS 330 may detect that the other vehicle 610 is in risk of crossing the median 600 and into the path of the ego vehicle 105. Accordingly, the proxemic risk system 320 may be used to determine a proxemic risk. This scenario may conceptually be considered the summation of the risks illustrated in FIGS. 4 and 5. For example, when the other vehicle 610 is behind or in front of the ego vehicle 105 (e.g., as sensed by the environment sensors 110 and/or determined by the ADAS 330), the proxemic risk system 320 may compute a risk metric and convey risk as described with respect to the example of FIG. 4; when the other vehicle 610 is beside the ego vehicle 105 (e.g., as sensed by the environment sensors 110 and/or determined by the ADAS 330), the proxemic risk system 320 may compute a risk metric and convey risk as described with respect to the example of FIG. 5

The proxemic risk system 320 may additionally or alternatively compute a risk metric based the combined risk of these two types of risks. The proxemic risk system 320 may estimate a future position of the ego vehicle 105 based on the stopping distance 602, which may be determined based on the current velocity of the ego vehicle 105 (e.g., based on data from vehicle sensors 140) and road conditions (e.g., based on data from environment sensors 110). The estimated future position of the ego vehicle 105 may be used to define the mean of a first PDF 604 representing a likely future position of the ego vehicle 105. The proxemic risk system 320 uses the sensed location of the other vehicle 610 (e.g., using sensor data from the LIDAR unit 114, radar unit 116, ultrasound unit 118 and/or camera 112) to define the mean of a second PDF 612 representing a likely future position of the other vehicle 610. The change (e.g., over a few timesteps) in the positions of each vehicle 105, 610 may be used to define the standard deviations of the first PDF 604 and second PDF 612, respectively.

In this example, because risk may be from the forward/backward axis as well as the lateral axis, the proxemic risk system 320 may define the first PDF 604 to be a combination of two 1D sub-PDFs 604*a*, 604*b*. One sub-PDF 604*a* (also referred to as the longitudinal sub-PDF 604*a* of the first PDF 604) is defined as a 1D Gaussian distribution along an axis corresponding to the forward direction of the ego vehicle 105, and a second sub-PDF 604*b* (also referred to as the lateral sub-PDF 604*b* of the first PDF 604) is defined as a 1D Gaussian distribution alone a lateral axis perpendicular to the forward direction of the ego vehicle 105. It should be understood that the first PDF 604 may encompass both sub-PDFs 604*a*, 604*b*, and a reference to the first PDF 604 may be considered a reference to either the sub-PDF 604*a*, the sub-PDF 604*b* or both sub-PDFs 604*a*, 604*b*. Similarly, the proxemic risk system 320 may define the second PDF 612 to be a combination of two 1D sub-PDFs 612*a*, 612*b*. One sub-PDF 612*a* (also referred to as the longitudinal sub-PDF 612*a* of the second PDF 612) is defined as a 1D Gaussian distribution along an axis corresponding to the forward direction of the ego vehicle 105, and a second sub-PDF 612*b* (also referred to as the lateral sub-PDF 612*b* of the second PDF 612) is defined as a 1D Gaussian distribution alone a lateral axis perpendicular to the forward direction of the ego vehicle 105. It should be understood that the second PDF 612 may encompass both sub-PDFs 612*a*, 612*b*, and a reference to the second PDF 612 may be considered a reference to either the sub-PDF 612*a*, the sub-PDF 612*b* or both sub-PDFs 612*a*, 612*b*. In the present disclosure, a 1D distribution refers to a probability distribution defined along one dimension in the physical space. It should be understood that the probability is an implied second dimension of the 1D distribution, however the term "1D" distribution is used in the present disclosure to more clearly relate the distribution to a single axis in the physical space.

The mean of each sub-PDF 604*a*, 604*b* of the first PDF 604 may be defined based on the estimated future position of the ego vehicle 105. For example, the estimated future position of the ego vehicle 105 in the forward/backward (or longitudinal) direction may be used to define the mean 606*a* of the longitudinal sub-PDF 604*a* of the first PDF 604, and the estimated future position of the ego vehicle 105 in the left/right (or lateral) direction may be used to define the mean 606*b* of the lateral sub-PDF 604*b* of the first PDF 604. The mean of each sub-PDF 612*a*, 612*b* of the second PDF 612 may be defined based on the sensed location of the other vehicle 610. For example, the sensed location of the other vehicle 610 in the forward/backward (or longitudinal) direction may be used to define the mean 614*a* of the longitudinal sub-PDF 612*a* of the second PDF 612, and the sensed location of the other vehicle 610 in the left/right (or lateral) direction may be used to define the mean 614*b* of the lateral sub-PDF 612*b* of the second PDF 612.

The change (e.g., over a few timesteps) in the longitudinal and lateral positions of the ego vehicle 105 may be used to define the standard deviations of the longitudinal and lateral sub-PDFs 604*a*, 604*b* of the first PDF 604, respectively. Similarly, the change in the longitudinal and lateral positions of the other vehicle 610 may be used to define the standard deviations of the longitudinal and lateral sub-PDFs 612*a*, 612*b* of the second PDF 612, respectively.

The proxemic risk system 320, after defining the first and second PDFs 604, 612 (including sub-PDFs), may compute the overlap 622*a* in the longitudinal sub-PDFs 604*a*, 612*a* (also referred to as longitudinal overlap 622*a*) to determine the proxemic risk in the forward direction. Additionally or alternatively, the proxemic risk system 320 may compute the overlap 622*b* in the lateral sub-PDFs 604*b*, 612*b* (also referred to as lateral overlap 622*b*) to determine the proxemic risk in the lateral direction. The proxemic risk system 320 may compute a longitudinal risk metric based on the longitudinal overlap 622*a* and may output signals to control output devices (e.g., haptic unit 138 and/or display device 136) to convey any longitudinal risk (e.g., similar to the example of FIG. 4) and/or may compute a lateral risk metric based on the lateral overlap 622*b* and may output signals to control output devices (e.g., haptic unit 138 and/or display device 136) to convey any lateral risk (e.g., similar to the example of FIG. 5). It may be appreciated that the proxemic risk system 320 may perform operations to determine both longitudinal risk and lateral risk in parallel, and may provide output that enables conveyance of risk in from both longitudinal and lateral directions at the same time.

For example, the proxemic risk system 320 may determine that the longitudinal risk metric exceeds a predefined longitudinal risk threshold and also that the lateral risk metric exceeds a predefined lateral risk threshold (which may or may not be the same as the longitudinal risk threshold), which may indicate that the ego vehicle 105 is at risk of a collision with the other vehicle 610 from both the front and left directions. In some examples, the proxemic risk system 320 may further determine a combined risk metric which may be a combination of the longitudinal and lateral risk metrics (e.g., by summing the longitudinal and lateral risk metrics) and determine that the combined risk metric exceeds a combined risk threshold.

Based on at least one risk threshold being exceeded, the proxemic risk system 320 may generate output signals that cause the ADAS 330 to activate selected haptic unit(s) 138 in the steering wheel 172 and selected haptic unit(s) 138 in the left side of the driver's seat cushion 186. The selected haptic units 138 may be controlled to vibrate at a frequency and intensity based on the intensity of the risk, which may be indicated by the summed magnitude of the longitudinal and lateral risk metrics. Alternatively, the selected haptic unit(s) 138 in the steering wheel 172 may be controlled to vibrate at a frequency and intensity based on the magnitude of the longitudinal risk metric only, while the selected haptic unit(s) 138 in the left side of the driver's seat cushion 186 may be controlled to vibrate at a frequency and intensity based on the magnitude of the lateral risk metric only. Various ways of controlling the haptic output may be implemented in order to convey the longitudinal and lateral risk to the driver.

The proxemic risk system 320 may continue to receive data (in real-time or near real-time) from the environment sensors 110 and vehicle sensors 104 and may update the mean and standard deviations of the first and second PDFs 604, 612 (and their respective sub-PDFs). The proxemic risk system 320 may also compute updated longitudinal and lateral risk metrics in real-time or near real-time (e.g., as time intervals of every fee 100 ms). As such, the output device(s) 134 may continue to be controlled to provide output to convey the risk scenario, which may change over time, until the risk has passed (e.g., until the other vehicle 610 has fully passed beyond the safe stopping distance 602 of the ego vehicle 105 and/or has fully entered the same lane as the ego vehicle 105 and is further than the safe stopping distance 602).

It may be appreciated that, rather than separating the first PDF 604 into longitudinal and lateral sub-PDFs 604*a*, 604*b* and similarly separating the second PDF 612 into longitudinal and lateral sub-PDFs 612*a*, 612*b*, the proxemic risk system 320 may define the first PDF 604 and second PDF 612 as respective 2D Gaussian distributions over both longitudinal and lateral axes. In such a scenario, instead of computing longitudinal and lateral overlaps 622*a*, 622*b* and computing longitudinal and lateral risk metrics, the proxemic risk system 320 may determine a single overlap volume and compute a single risk metric. However, the use of longitudinal and lateral sub-PDFs that are 1D distributions (e.g., 1D Gaussian distributions) may be more simple computationally to implement (e.g., requiring fewer complex computations, less memory resources, less computing time, etc.) and thus may enable determination of risk in a real-time or near real-time manner.

Figure 7:
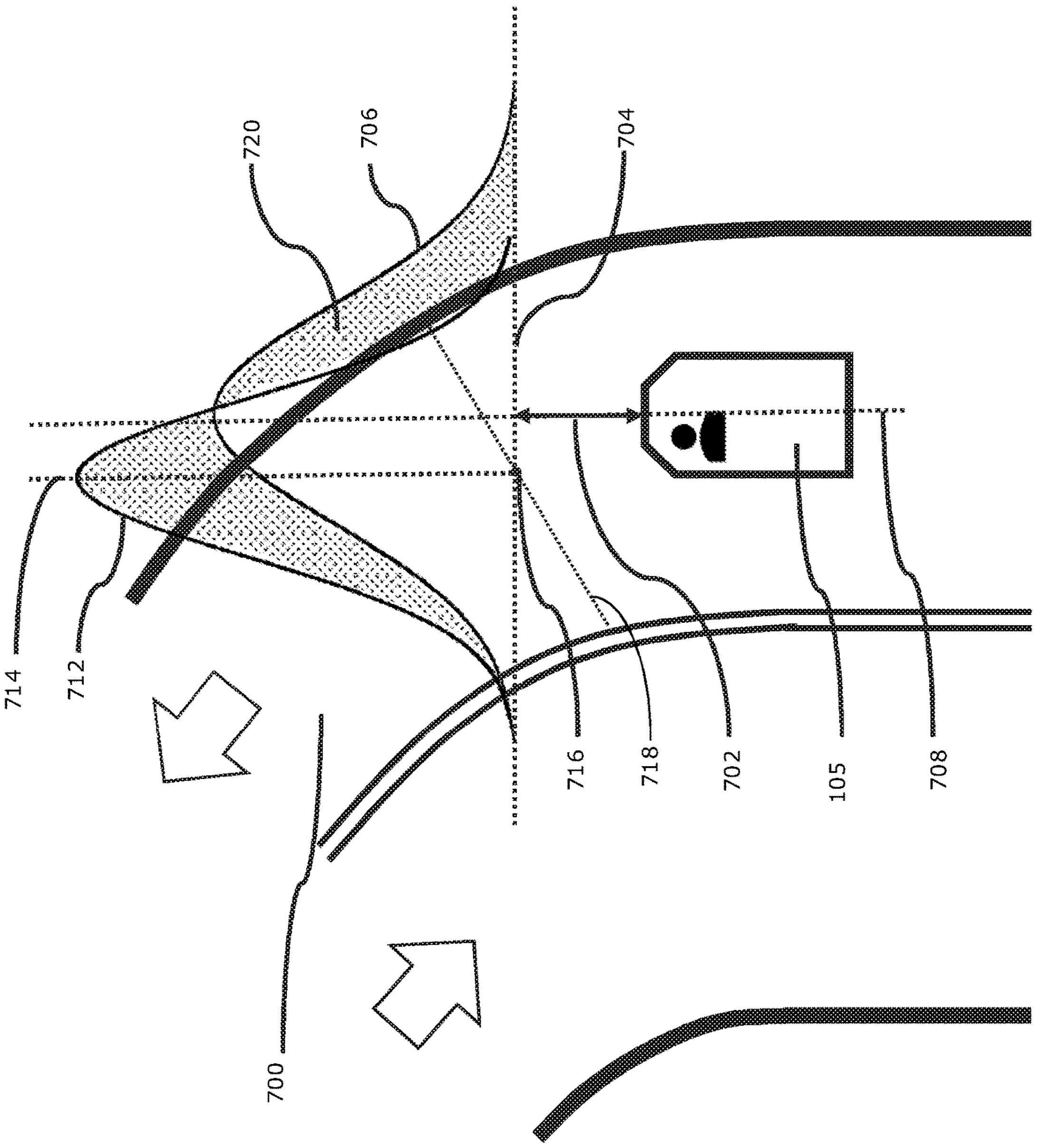
FIG. 7 illustrates example probability density functions that may be defined for an ego vehicle and a curve in the lane in an example where there may be a risk of lane deviation, in accordance with examples of the present disclosure.

FIG. 7 illustrates an example of how the proxemic risk system 320 may determine a proxemic risk due to a change in the road.

In this scenario, the ego vehicle 105 may be at risk of moving out of the road boundary due to the driver being unaware of a change in the road (e.g., if the driver is distracted or visual conditions are poor), in this case an upcoming curve 700. In this example, the proxemic risk does not reflect the presence of another vehicle (as in the examples of FIGS. 4-6) but rather reflects whether the ego vehicle 105 is being driven safely according to the road conditions.

The ADAS 330 may identify the road boundary using data from environment sensors 110 (e.g., camera 112, LIDAR unit 114, radar unit 116 and/or ultrasound unit 118) and/or the satellite receiver 132 (e.g., GPS), and/or using mapping data. The ADAS 330 may determine that the road boundary has an upcoming curve 700 and may communicate the detected curve to the proxemic risk system 320. The proxemic risk system 320 may perform the operations described below to determine a proxemic risk due to the upcoming curve 700.

The current velocity of the ego vehicle 105 and current road conditions may be determined using data from environment sensors 110 and vehicle sensors 140, and this information may be used to determine the safe stopping distance 702. Based on the safe stopping distance 702, a future estimated position 704 of the ego vehicle 105 may be determined. A first PDF 706, which may be a Gaussian distribution, is defined by the proxemic risk system 320 to represent the likely future position of the ego vehicle 105. In this example, risk may arise if the ego vehicle 105 does not turn to following the curve 700, meaning that risk is in the lateral direction. Thus, the first PDF 706 is defined along the lateral axis to represent the likely future lateral position of the ego vehicle 105. The mean 708 of the first PDF 706 is defined by the future estimated position 704 of the ego vehicle 105 in the lateral direction, and the standard deviation of the first PDF 706 is defined by the change (e.g., over a few timesteps) in lateral position of the ego vehicle 105.

The proxemic risk system 320 defines a second PDF 712 along the lateral axis to represent the distribution of safe trajectories that may be followed while staying within the road boundary. The mean 714 of the second PDF 712 may be defined as the midpoint 716 of the lane width 718 (e.g., as determined by the ADAS 330). The standard deviation of the second PDF 712 may be based on the lane width 718 (e.g., the standard deviation may be defined such that 95% of the second PDF 712 falls within the lane width 718) or may be based on statistical data (e.g., based on aggregated statistics, which may be collected in various ways, of vehicles navigating this curve 700 or a similar curve).

In this example, proxemic risk (e.g., the risk of the ego vehicle 105 driving out of the road) is represented by the non-overlap 720 between the first and second PDFs 706, 712. Because the non-overlap 720 is the complement of the overlap between the first and second PDFs 706, 712, the proxemic risk system 320 may compute the overlap between the first and second PDFs 706, 712 and compute a risk metric based on the overlap (e.g., compute a risk metric based on the complement of the overlap), instead of computing the non-overlap 720 directly. For example, the risk metric may be defined as:

$$S = -\log_2(\%\text{ overlap}) \qquad \text{Equation 7}$$

It may be appreciated that % overlap denotes the amount of overlap between the first and second PDFs 706, 712 and that the complement of this is (1-% overlap). Thus, Equation 7 may be understood to be a computation of the risk metric using Equation 1, where the complement of the overlap (1-% overlap) replaces the % overlap in Equation 1.

Similar to the examples described previously, the risk metric may be compared against a risk threshold (which may or may not be specific to this road scenario). If the risk metric exceeds the risk threshold, the proxemic risk system 320 may provide output to cause output devices 134 (e.g., display device 136 and/or haptic units 138) to provide output to convey the proxemic risk.

Figure 8:
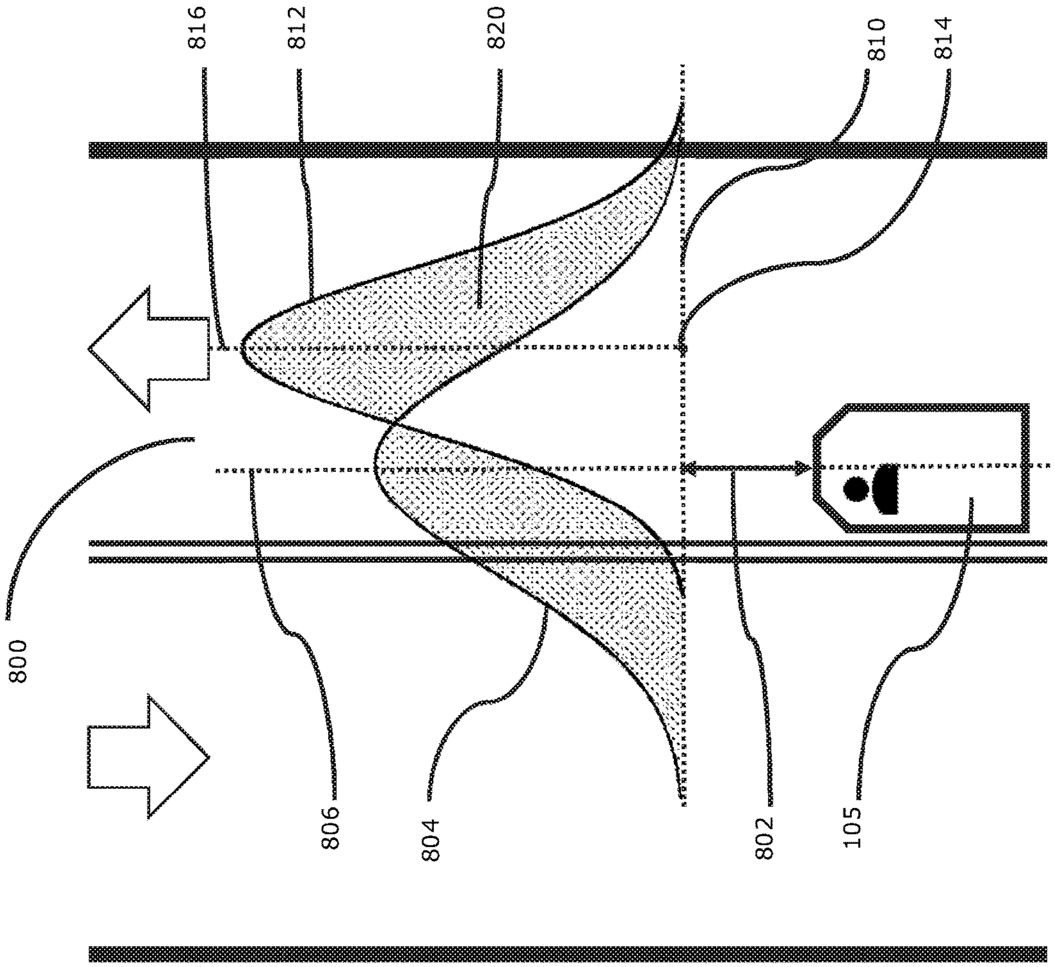
FIG. 8 illustrates example probability density functions that may be defined for an ego vehicle and a straight lane in another example where there may be a risk of lane deviation, in accordance with examples of the present disclosure.

FIG. 8 illustrates another example of how the proxemic risk system 320 may determine a proxemic risk due to the position of the ego vehicle 150 with respect to the road.

In this scenario, the ego vehicle 105 is at risk of straying from the lane 800 (e.g., due to driver distraction, poor steering, etc.). Similar to the example of FIG. 7, the ADAS 330 may determine the lane boundary and the lane width 810 using data from environment sensors 110 and/or stored mapping data. The stopping distance 802 of the ego vehicle 105 may be determined based on the current velocity of the ego vehicle 105 (e.g., determined by vehicle sensors 140) and road conditions.

Similar to the example of FIG. 7, the risk in this scenario is in the lateral direction. Thus, the proxemic risk system 320 defines the first PDF 804 (which may be a Gaussian distribution) along the lateral axis to represent the likely future lateral position of the ego vehicle 105. The mean of 806 of the first PDF 804 is defined by the estimated future lateral position of the ego vehicle 105, and the standard deviation of the first PDF 804 is defined based on the change (e.g., over a few timesteps) of the lateral position of the ego vehicle 105. The proxemic risk system 320 defines the second PDF 812 (which may be a Gaussian distribution) along the lateral axis to represent the distribution of safe trajectories that may be followed while staying within the lane 800. The mean and standard deviation of the second PDF 812 may be defined based on parameters of the lane 800. For example, the midpoint 814 of the lane width 810 may define the mean 816 of the second PDF 812, and the standard deviation of the second PDF 812 may be defined such that 95% of the second PDF 812 falls within the lane width 810. In some examples, the standard deviation of the second PDF 812 may be defined based on statistical data (e.g., based on aggregated statistics, which may be collected in various ways, of vehicles navigating this lane 800 or another lane having similar parameters).

Similar to the example of FIG. 7, the proxemic risk (e.g., the risk of the ego vehicle 105 leaving the lane 800) in this scenario is represented by the non-overlap 820 between the first and second PDFs 804, 812, which is equivalent to the complement of the overlap between the first and second PDFs 804, 812. The proxemic risk system 320 may compute a risk metric based on the overlap between the first and second PDFs 804, 812 (e.g., compute a risk metric based on the complement of the overlap), for example using Equation 7 as discussed with respect to the example of FIG. 7.

Similar to the examples described previously, the risk metric may be compared against a risk threshold (which may or may not be specific to this road scenario). If the risk metric exceeds the risk threshold, the proxemic risk system 320 may provide output to cause output devices 134 (e.g., display device 136 and/or haptic units 138) to provide output to convey the proxemic risk. In some examples, to avoid unnecessary outputs when a lane change is intended, the proxemic risk system 320 may cooperate with the ADAS 330 to provide output to convey the proxemic risk of leaving the lane when there is no indication that a lane change is intentional (e.g., when the indicator lights of the ego vehicle 105 are not turned on).

It may be appreciated, from the examples of FIGS. 7 and 8, that the risk metric representing the risk of the ego vehicle 105 driving straight on a curved road is analogous to the risk metric representing the risk of the ego vehicle 105 moving out of its lane on a straight road. In general, these examples illustrate that the proxemic risk system 320, as disclosed herein, may enable determination of proxemic risk in driving scenarios where the risk is not necessarily due to moving objects such as other vehicles. Instead, the proxemic risk may be due to the ego vehicle 105 deviating from a safe trajectory.

The proxemic risk system 320 may determine a proxemic risk based on an aggregation or summation of multiple risk factors. The example of FIG. 6 illustrates how the proxemic risk system 320 may determine the aggregate risk from two directions (e.g., from the longitudinal direction as well as lateral direction), where the risk is from one risk source. The proxemic risk system 320 may also determine an aggregate risk from two risk sources, as illustrated in the example of FIG. 9.

Figure 9:
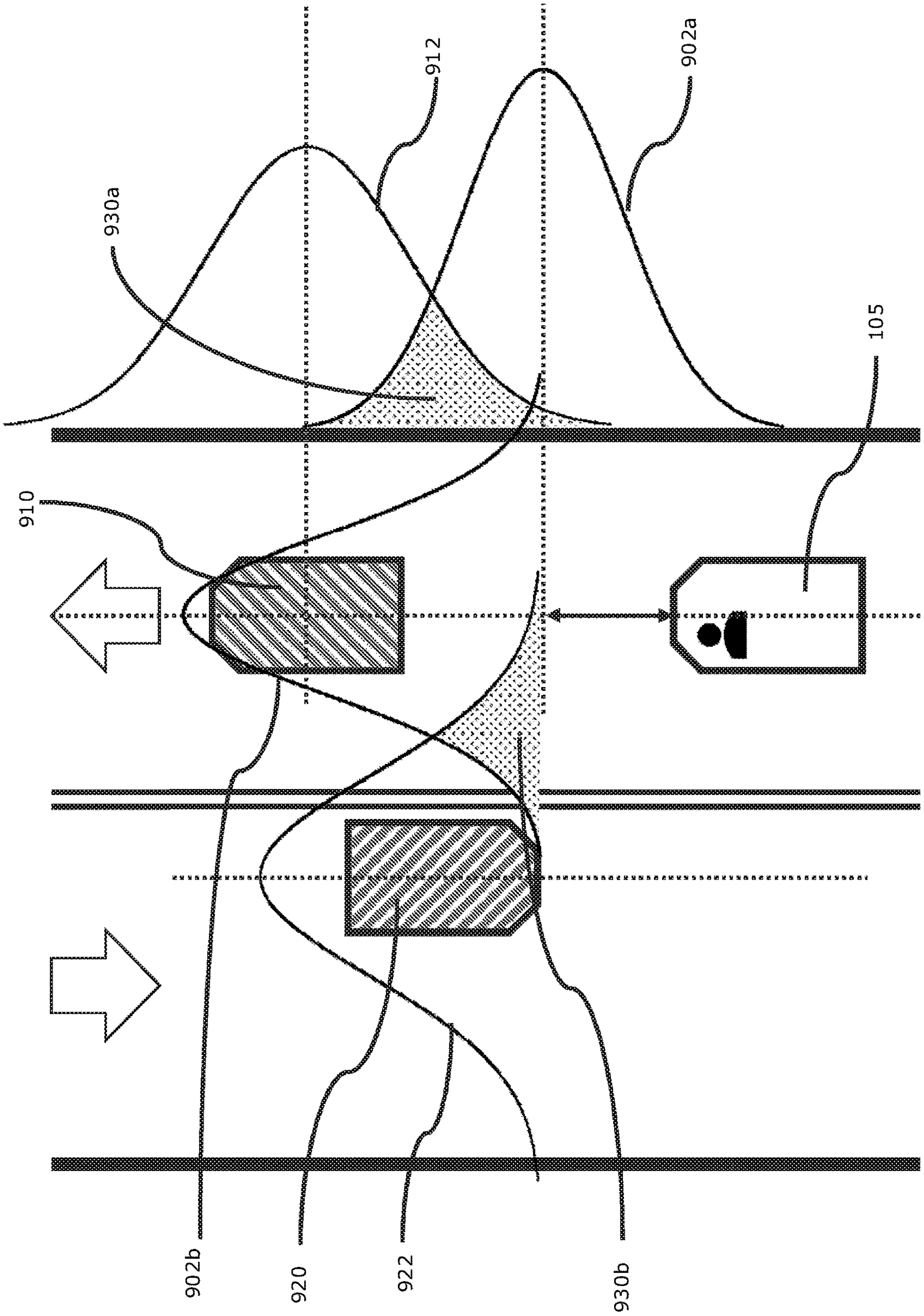
FIG. 9 illustrates example probability density functions that may be defined for an ego vehicle and multiple other vehicles in an example where there may be different collision risks, in accordance with examples of the present disclosure.

FIG. 9 illustrates an example of how the proxemic risk system 320 may determine a proxemic risk due in a traffic scenario where there are two other vehicles.

In this scenario, there are two other vehicles 910, 920 in the proximity of the ego vehicle 105. A same-direction vehicle 910 is the same lane in front of the ego vehicle 105 and an oncoming vehicle 920 is in the lane beside the ego vehicle 105. Both the same-direction vehicle 910 and the oncoming vehicle 920 may be sources of a risk of head-on collision. The proxemic risk system 320 may determine the proxemic risk in this scenario based on a combination of the risk of a collision with the same-direction vehicle 910 (e.g., similar to the example of FIG. 4) and the risk of a collision with the oncoming vehicle 920 (e.g., similar to the example of FIG. 5). Details of this are described below.

The proxemic risk system 320 may perform operations to define a first longitudinal PDF **902*a* along the longitudinal (or forward/backward) direction, representing the likely future longitudinal position of the ego vehicle 105 and to define a second PDF 912 representing a likely longitudinal position of the same-direction vehicle 910. The operations to define the first longitudinal PDF 902*a* and the second PDF 912 may be similar to that previously described with respect to the example of FIG. 4** and need not be repeated here.

The proxemic risk system 320 may also perform operations to define a first lateral PDF **902*b* along the lateral (or left/right) direction, representing the likely future lateral position of the ego vehicle 105 and to define a third PDF 922 representing a likely lateral position of the oncoming vehicle 920. The operations to define the first lateral PDF 902*b* and the third PDF 922 may be similar to that previously described with respect to the example of FIG. 5** and need not be repeated here.

The longitudinal overlap **930*a* between the first longitudinal PDF 902*a* and the second PDF 912 and the lateral overlap 930*b* between the first lateral PDF 902*b* and the third PDF 922 may be both computed by the proxemic risk system 320. Since each overlap 930*a*, 930*b* area represents the risk of a head-on collision with a respective vehicle 910, 920, the proxemic risk system 320 may sum the areas of the overlaps 930*a*, 930*b* to obtain an aggregate overlap that represents the aggregate risk of head-on collision with either vehicle 910, 920. The aggregate overlap may then be used to compute a risk metric (e.g., using Equation 1 described previously) representing the aggregate risk of a head-on collision. This risk metric may be compared with a risk threshold, and risk (if any) may be conveyed using the haptic units 138 and/or display device 136** as previously described.

Although FIG. 9 illustrates a particular scenario, the operations for determining PDFs for risk sources separately and then aggregating the risk into a single risk metric may be generally applicable in various scenarios. For example, the risk of a collision from different vehicles in adjacent lanes may be aggregated together. In another example, the risk of the ego vehicle 105 departing from its own lane may be aggregated with the risk of another vehicle in an adjacent lane veering into the lane of the ego vehicle 105. Thus, it should be understood that the ability for the proxemic risk system 320 to determine an aggregate risk and to provide output to convey this risk to a driver may not be limited to the scenario described above.

The proxemic risk system 320 may determine the proxemic risk in various driving scenarios by computing a risk metric. As described above, the risk metric may be defined using Equation 1, Equation 2, or Equation 7. The proxemic risk system 320 may select the appropriate definition of the risk metric depending on the particular traffic scenario. For example, Equation 7 may be used in scenarios where the risk is related to road deviation, whereas Equations 1-2 may be used for risks related to collision with other vehicles.

Figure 10A:
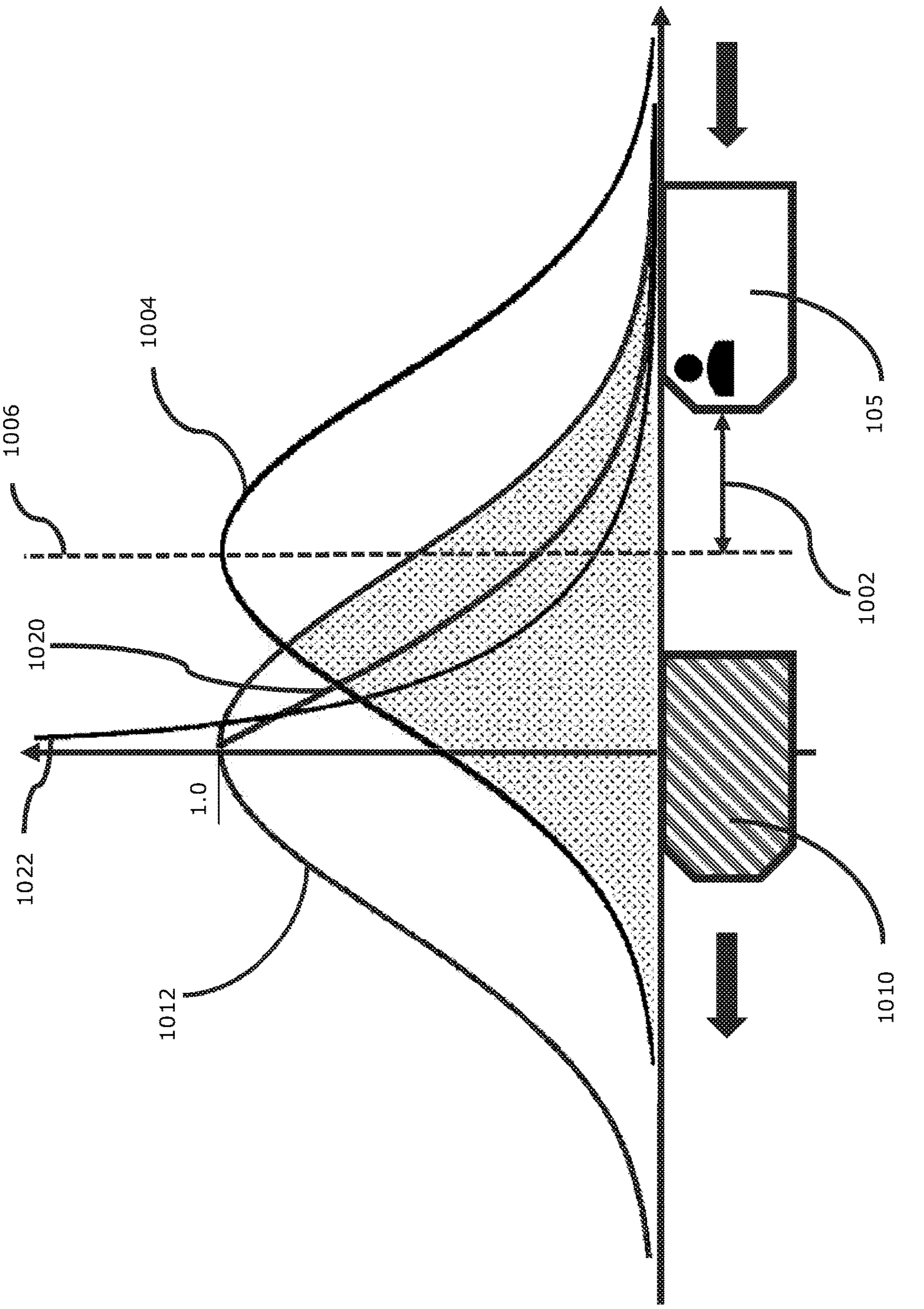
FIGS. 10A and 10B illustrate examples of how the risk metric may be defined using different equations disclosed herein, in accordance with examples of the present disclosure.
Figure 10B:
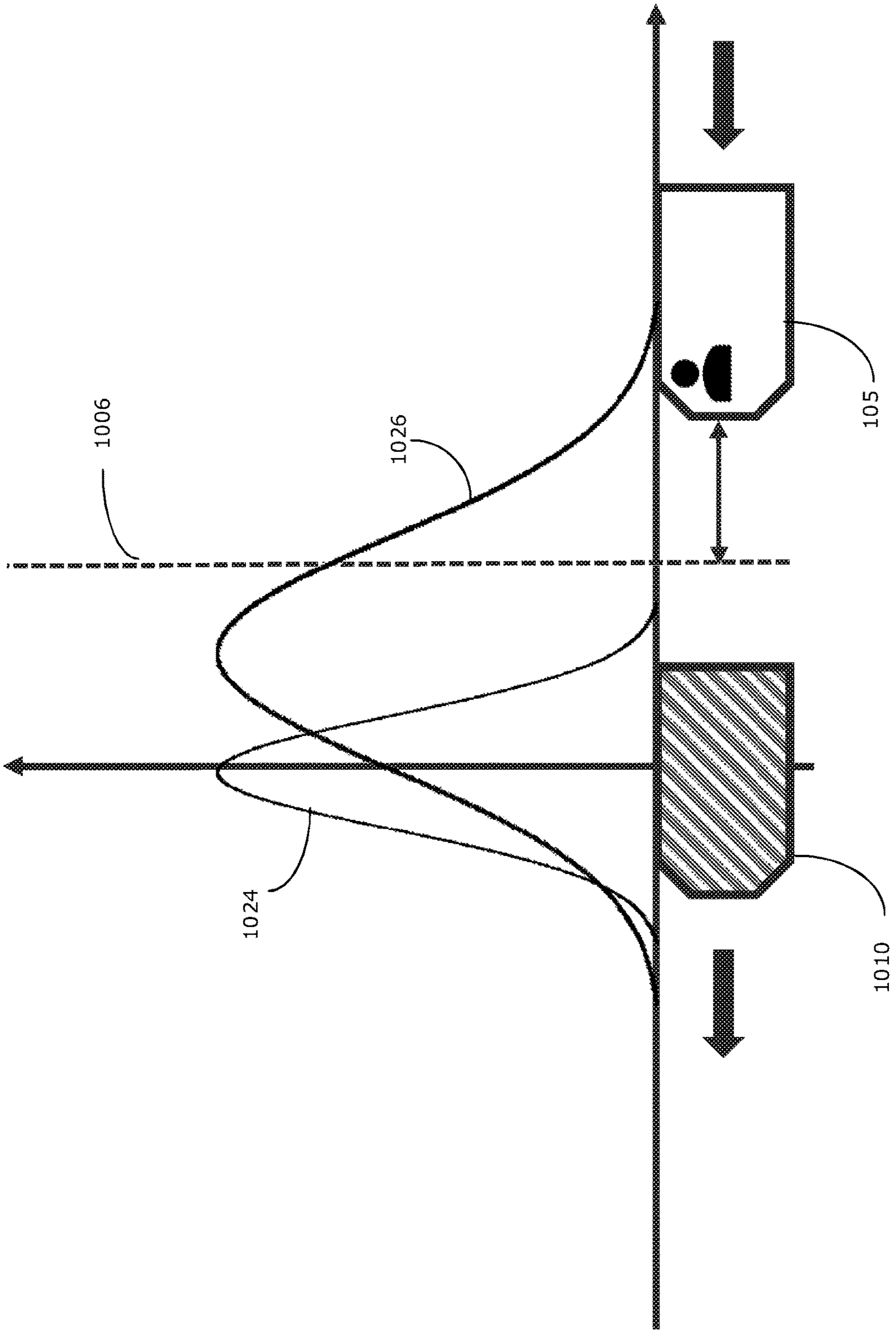

FIGS. 10A and 10B illustrate the meaning of different definitions of the risk metric (e.g., defined using Equation 1, Equation 2 or Equation 7) in a practical application.

FIG. 10A illustrates how the risk metric defined according to Equation 1 may be used to determine a risk of a rear-end collision.

In this example, the ego vehicle 105 is driving behind another vehicle 1010 in the same lane. There is a risk of a rear-end collision (as previously described with respect to FIG. 4). The future position of the ego vehicle 105 may be estimated based on the stopping distance 1002 (which may be determined by the current velocity of the ego vehicle 105 and road conditions, based on data from environment and vehicle sensors 110, 140). As previously described, the proxemic risk system 320 may define first and second PDFs 1004, 1012 corresponding to the ego vehicle 105 and the other vehicle 1010, respectively. The first PDF 1004 represents the likely future position of the ego vehicle 105, and the mean 1006 of the first PDF 1004 is defined based on the estimated future position of the ego vehicle 105. The second PDF 1012 represents the likely position of the other vehicle 1010, and the mean of the second PDF 1012 is defined based on the sensed location of the other vehicle 1010.

In FIG. 10A, the mean of the second PDF 1012 is lined up with a vertical axis of a chart that shows a plot 1020 of the area of the overlap between the first and second PDFs 1004, 1012 as a function of the mean 1006 of the first PDF 1004. Also shown in FIG. 10A is a plot 1022 of the risk metric (calculated using Equation 1) as a function of the mean 1006 of the first PDF 1004. As illustrated in FIG. 10A, when the mean 1006 of the first PDF 1004 approaches the mean of the second PDF 1012 (i.e., towards the vertical axis), the area of overlap increases and the risk metric also rises. When the mean 1006 of the first PDF 1004 coincides with the mean of the second PDF 1012, the first PDF 1004 completely overlaps with the second PDF 1012 (meaning the ego vehicle 105 is in the same physical space as the other vehicle 1010), meaning the area of overlap reaches a maximum of 100% or a value of 1.0 as shown in FIG. 10A. According to Equation 1, this results in the risk metric rising to infinity.

Conversely, when the mean 1006 of the first PDF 1004 moves farther from the mean of the second PDF 1012 (i.e., away from the vertical axis), meaning the distance between the ego vehicle 105 and the other vehicle 1010 increases, the area of overlap decreases and the risk metric also decreases. Thus, FIG. 10A illustrates how the risk metric has an intuitive meaning in that the closer the ego vehicle 105 is to the other vehicle 1010, the greater the risk of collision and hence the higher the risk metric; while the farther the ego vehicle 105 is from the other vehicle 1012, the lower the risk of collision and hence the lower the risk metric.

FIG. 10B illustrates how the risk metric, defined in various equations described above based on the ratio W/A, may be used to determine a risk of a rear-end collision.

FIG. 10B illustrates the same driving scenario as FIG. 10A, but rather than showing the first and second PDFs 1004, 1012, FIG. 10B is intended to illustrate the meaning of W and A, as used in the above-discussed equations. FIG. 10B shows a plot 1024 of the width (denoted W in equations), which as previously explained refers to the variation in relative speed (e.g., sampled over a few timesteps) between the ego vehicle 105 and the other vehicle 1010. FIG. 10B also shows a plot 1026 of the amplitude (denoted A in equations), which as previously explained refers to the variation in relative distance (e.g., sampled over a few timesteps) between the ego vehicle 105 and the other vehicle 1010. It may be appreciated that because the relative speed or distance between the ego vehicle 105 and the other vehicle 1010 is symmetric, the variation in speed of the ego vehicle 105 may be omitted in equations based on the ratio W/A.

The proxemic risk system 320 may selectively use any of the equations disclosed herein to compute the risk metric. Additionally or alternatively, the proxemic risk system 320 may compute the risk metric using two or more different definitions and/or may convert the risk metric between these definitions depending on the application.

For example, the definition of the risk metric according to Equation 2 may be useful for modeling, in information bits, the stress level or cognitive load on a driver due to the proxemic risk. A bit-based definition of the risk metric according to Equation 6 may be useful for adjusting UI elements of a UI displayed on the display device 136. For example, the bit-based risk metric may represent the cognitive load, in bits, on the driver due to the proxemic risk, meaning that the information presented via the UI should be reduced by at least an equivalent number of information bits, in order to over overloading the driver's attention (and possibly causing a collision).

Figure 11:
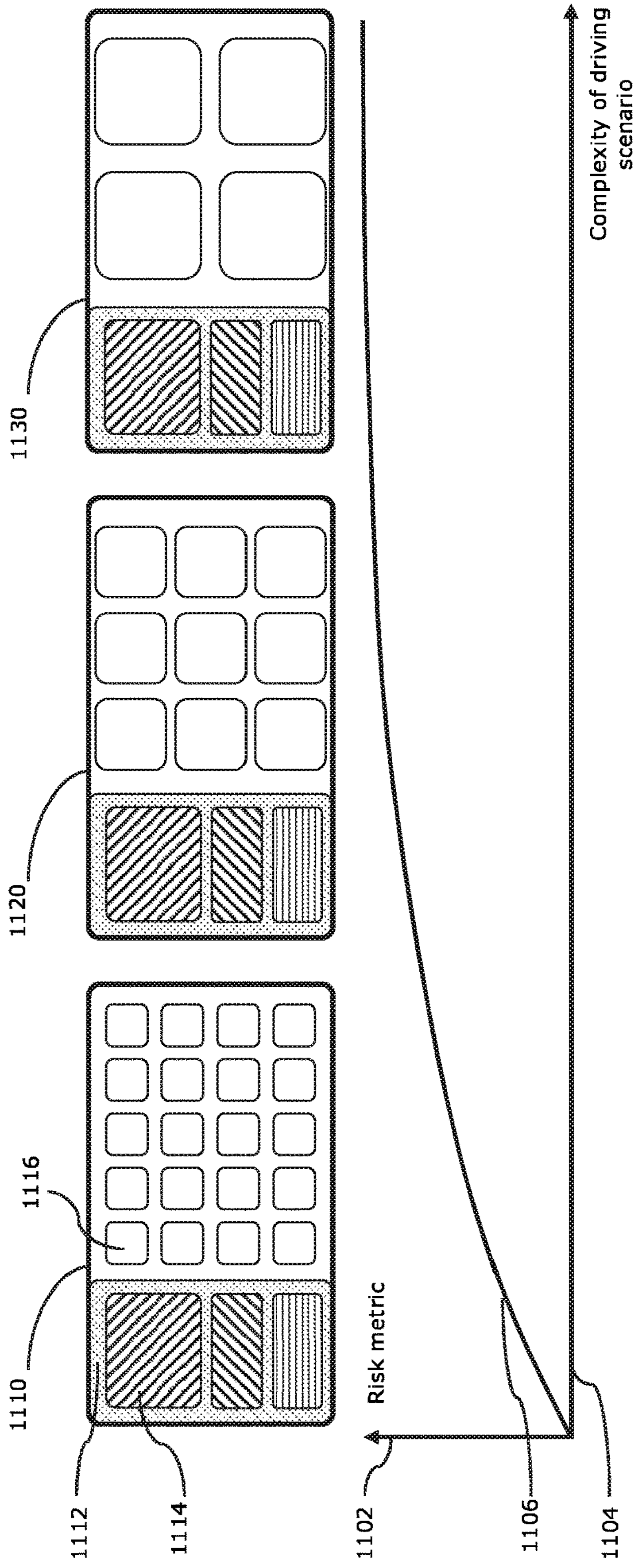
FIG. 11 illustrates an example of how a user interface may be controlled based on a risk metric, in accordance with examples of the present disclosure.

FIG. 11 illustrates an example of how a bit-based risk metric may be used to control the amount of information displayed on the display device 136.

In this example, the display device 136 displays a default UI 1110 that includes a side bar 1112 containing notifications and shortcut elements 1114, as well as a plurality of icons 1116. The driver may interact with any of the UI elements 1114, 1116, for example by touching the display device 136 (e.g., in examples where the display device 136 is a touch-sensitive display), by navigating and selecting a desired element 1114 using buttons (not shown) and/or by verbal commands, among other possibilities. As may be appreciated, having a higher number of elements 1114, 1116 displayed in the UI 1110 may place a greater cognitive load on the driver, which may draw the driver's attention away from the driving task. At the same time, it may be desirable to provide more options and more information via the UI 1110, to improve driver convenience and/or comfort (e.g., to enable the driver to easily control radio functions, temperature, etc.). Thus, merely simplifying the UI 1110 across all driving scenarios may be an overly simplistic solution to avoid driver distraction, which may not result in a preferred driver experience.

FIG. 11 illustrates an approach to controlling the amount of information presented via the UI 1110, based on the cognitive load introduced by various driving scenarios as represented by the bit-based risk metric. The lower portion of FIG. 11 shows a chart having the risk metric (in bits) on the vertical axis 1102 and increasing complexity of driving scenario on the horizontal axis 1104. The plot 1106 illustrates that in less complex driving scenarios (e.g., no other moving vehicles in proximity of the ego vehicle 105), the bits of risk metric is lower; and in more complex driving scenarios (e.g., multiple other moving vehicles around the ego vehicle 105), the bits of risk metric is higher.

The proxemic risk system 320 may compute the risk metric in bits, as previously discussed, and output the bit-based risk metric to the operating system 160 of the vehicle 105, which in turn controls the amount of information presented via the UI 1110. When the risk metric is low (e.g., is below a first defined risk threshold), the UI 1110 may provide a default number of UI elements 1114, 1116. When the risk metric is moderate (e.g., greater than the first defined risk threshold but lower than a second, higher risk threshold), a reduced number of UI elements may be provided in the reduced-load UI 1112. When the risk metric is high (e.g., greater than the second, higher risk threshold), a minimal number of UI elements may be provided in the minimal-load UI 1114. Comparing the risk metric to defined risk thresholds in this manner may control the UI in a stepwise fashion.

In some examples, the UI may be controlled in a more gradual fashion. For example, a maximum permitted amount of information (in bits) may be assigned to the UI. Each UI element that is provided by the UI may contribute a finite number of information bits, thus the maximum permitted information bits assigned to the UI may be directly correlated to the maximum number of UI elements provided by the UI at a given time. The proxemic risk system 320 may output a risk metric in bits representing a current proxemic risk. The operating system 160 may then subtract the bits of the risk metric from the maximum permitted information bits to arrive at a useable number of information bits that may be used by the UI to provide output, given the current proxemic risk. The operating system 160 may determine, given the useable number of information bits, the number of UI elements that may be provided by the UI. In this way, the UI may be dynamically controlled based on the real-time or near real-time proxemic risk determined by the proxemic risk system 320.

In some examples, some UI elements may be prioritized over other UI elements (e.g., based on frequency of usage, recency of usage, context, etc.). When there is a reduced number of UI elements provided in the UI, higher priority UI elements may be provided while lower priority UI elements may be omitted.

Figure 12:
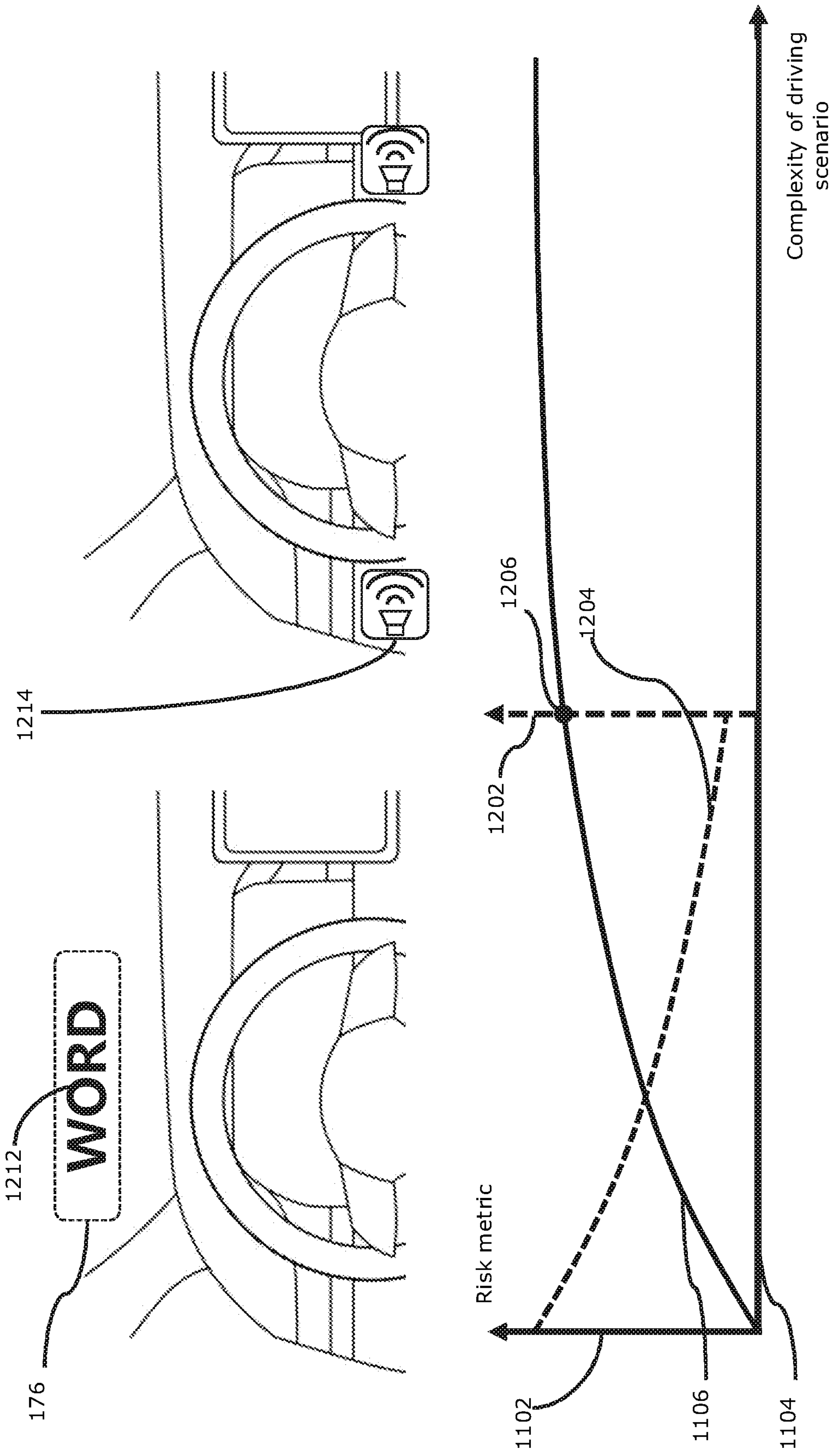
FIG. 12 illustrates an example of how a messaging application may be controlled based on a risk metric, in accordance with examples of the present disclosure.

FIG. 12 illustrates another example of how a bit-based risk metric may be used to control the amount of information provided to the driver via output devices 134.

In this example, a messaging application is executed by the operating system 160. Received messages may be outputted visually (e.g., via the display device 136) and/or audibly (e.g., via speakers). The operating system 160 may adapt the modality for outputting a received message, or may prevent a received message from being immediately outputted to the driver, depending on the risk metric.

In this example, a received message may be displayed in a HUD 176. The received message may be displayed one word 1212 at a time in the HUD 176, for example using rapid serial visual presentation (RSVP) as described by Bruijin et al. ("Rapid Serial Visual Presentation: A space-time trade-off in information presentation" *Proceedings of Advanced Visual Interfaces, AVI,* 2000). Other techniques for visually outputting the received message to the driver may be used, for example displaying snippets of the received message via the HUD 176 or display device 136.

FIG. 12 shows the plot 1106 of risk metric (in bits) against increasing complexity of driving scenario, as previously described. FIG. 12 also includes a plot 1204 representing the speed at which a word 1212 or snippet of the received message is presented to the driver. The operating system 160 may adapt the speed of visual output depending on the risk metric. Thus, when the risk metric is higher (indicating greater cognitive load on the driver due to proxemic risk), the visual output of the received message is provided at a slower speed to reduce the information presented to the driver (and thus reduce overall cognitive load). The speed at which the visual output is provided may be adjusted gradually, as illustrated by the plot 1204 in FIG. 12 (e.g., inversely proportional to the risk metric) or stepwise (e.g., based on comparing the risk metric to different risk thresholds).

In this example, when the risk metric reaches a defined risk threshold 1206 (which may represent a certain complexity of driving scenario 1202), the operating system 160 may automatically convert the received message from visual output (e.g., via the HUD 176 or display device 136) to audio output (e.g., via a speaker 1214). For example, the operating system 160 may use any suitable text-to-speech conversion software to convert text in the message to an audible message. Audio output may require lower cognitive load to process compared to visual output.

In some examples, if the risk metric reaches a second, higher risk threshold (not shown), the operating system 160 may suppress all outputs of a received message, regardless of output modality, to enable the driver to fully focus on the driving task. The received message may, for example, be outputted to the driver at a later time when the proxemic risk has passed (e.g., when the risk metric is below the lower risk threshold 1206).

Figure 13:
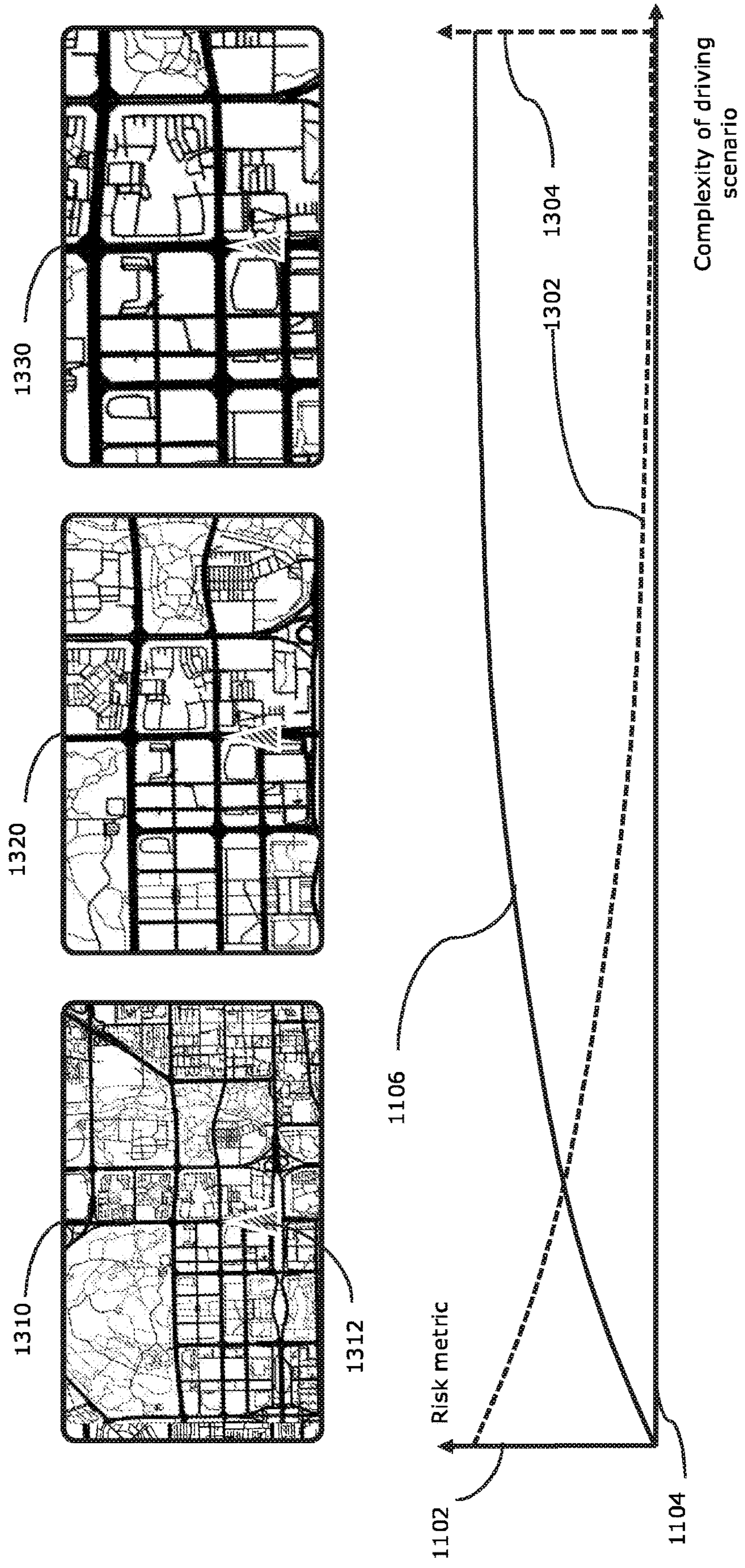
FIG. 13 illustrates an example of how a map application may be controlled based on a risk metric, in accordance with examples of the present disclosure.

FIG. 13 illustrates another example of how a bit-based risk metric may be used to control the amount of information provided to the driver via output devices 134.

In this example, a map application is executed by the operating system 160. The map application may display a visual map at a default highly-detailed level 1310 in normal situations (e.g., when there is no proxemic risk). The position of the ego vehicle 105 may be indicated by a symbol 1312 (e.g., a triangle pointed towards the current direction of movement) on the visual map. The operating system 160 may adapt amount of information presented by the map application, depending on the risk metric.

FIG. 13 shows the plot 1106 of risk metric (in bits) against increasing complexity of driving scenario, as previously described. FIG. 13 also includes a plot 1302 with a vertical axis 1304 representing the size of the geographic area displayed by the map. When the risk metric is low (indicating lower cognitive load on the driver due to low proxemic risk), the operating system 160 may control the map application to display the map at the highly-detailed level 1310. As the risk metric increases (indicating greater cognitive load on the driver due to proxemic risk), the operating system 160 may adapt the scale (or zoom level) of the displayed map such that a smaller geographic area is displayed by the map, meaning the map is displayed at a higher zoom so that less information is presented (and thus overall cognitive load is reduced). For example, when the risk metric is at a moderate level, the map may be adjusted to be displayed at a moderately-detailed level 1320, which shows a smaller geographic area than when the map is displayed at the highly-detailed level 1310. When the risk metric is at a high level, the map may be further adjusted to be displayed at a low-detailed level 1330, which shows an even smaller geographic area than when the map is displayed at the moderately-detailed level 1320.

The level of detail displayed by the map may be adjusted in a stepwise fashion, for example, by comparing the risk metric to a risk threshold and adjusting the detail level of the map when the risk metric exceeds the risk threshold. In other examples, the level of detail may be adjusted gradually, for example as illustrated by the plot 1302 in FIG. 13 (e.g., approximately inversely proportional to the risk metric). In some examples, the amount of information presented by the map may be quantified, such as by the size of the geographic area in the displayed map, and represented as information bits. A maximum permissible information bits may be assigned to the map application. The risk metric, in bits, may be subtracted from the maximum permitted information bits to arrive at the useable number of information bits that may be used by the map application. The operating system 160 may determine, given the useable number of information bits, the size of the geographic area that may be displayed in the map and may adjust the zoom level of the map accordingly. In this way, the map may be dynamically controlled based on the real-time or near real-time proxemic risk determined by the proxemic risk system 320.

In some examples, in addition to adjusting the zoom level of the map, other information presented by the map application may also be adjusted based on the risk metric. For example, when the risk metric is high, road names and symbols may be displayed in a larger size.

Adjusting the displayed map in this manner may inform the driver about proxemic risk while the driver is focused on the map. For example, if the driver is focused on the map (and may be distracted from the driving task) and the map changes zoom level to show less visual information, this may indicate to the driver that the level of proxemic risk has increased.

Figure 14:
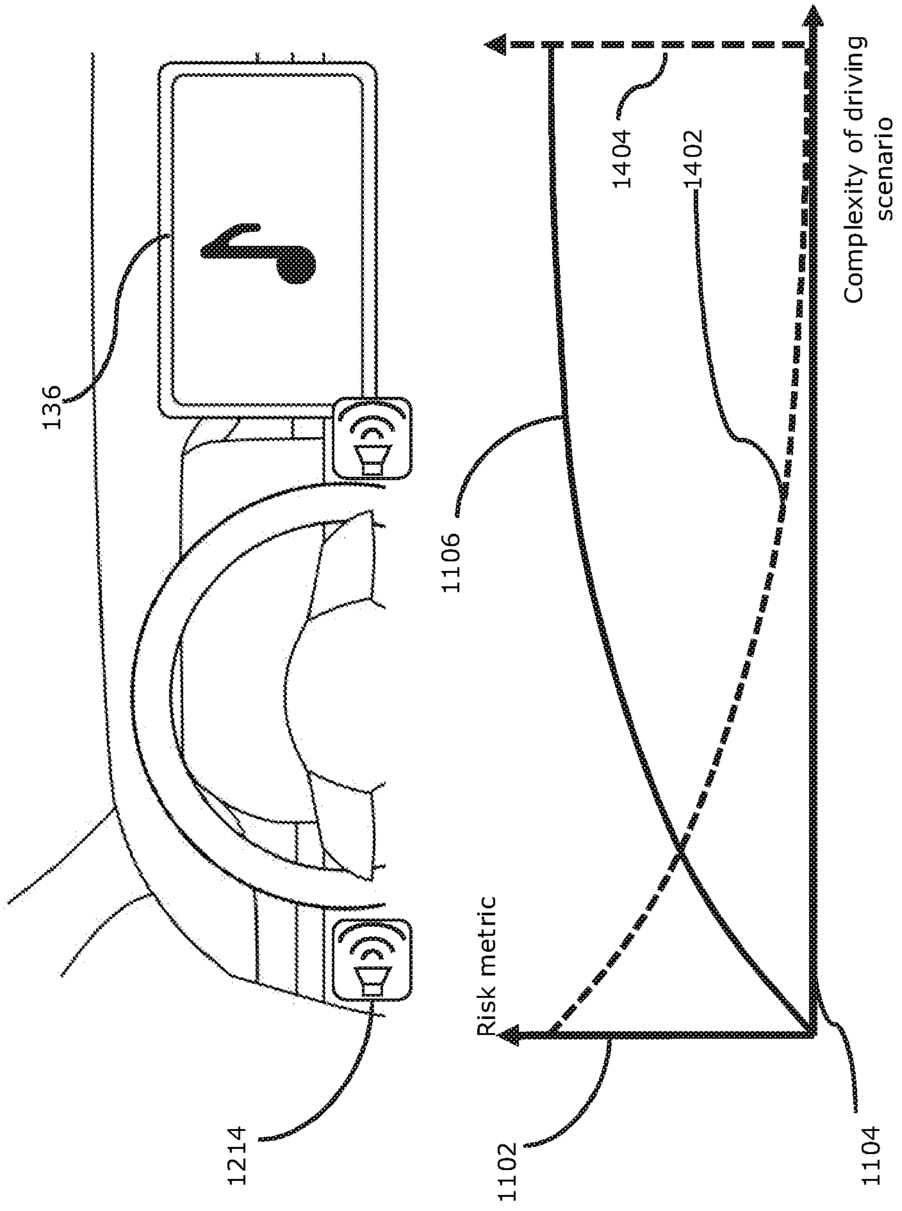
FIG. 14 illustrates an example of how a music application may be controlled based on a risk metric, in accordance with examples of the present disclosure.

FIG. 14 illustrates another example of how a bit-based risk metric may be used to control the amount of information provided to the driver via output devices 134.

In this example, a music application is executed by the operating system 160. The music application may, for example, display information about a song (e.g., song title, artist, playtime, etc.) on the display device 136 while the song is outputted by a speaker 1214. The operating system 160 may adapt the volume of music and/or song information, depending on the risk metric.

FIG. 14 shows the plot 1106 of risk metric (in bits) against increasing complexity of driving scenario, as previously described. FIG. 14 also includes a plot 1402 with a vertical axis 1404 representing the audio volume. When the risk metric is low (indicating lower cognitive load on the driver due to low proxemic risk), the operating system 160 may permit music to be played at any audio volume up to a default maximum volume. As the risk metric increases (indicating greater cognitive load on the driver due to proxemic risk), the operating system 160 may lower the volume of music so that the driver may focus on the driving task. Additionally, the operating system 160 may limit the amount of song information displayed by the display device 136 (e.g., display only song title, or turn off the display device 136 entirely) as the risk metric increases. As described in previous examples, the music application may be controlled in the stepwise fashion or gradually (e.g., the volume may be controlled approximately inversely proportional to the risk metric).

Figure 15:
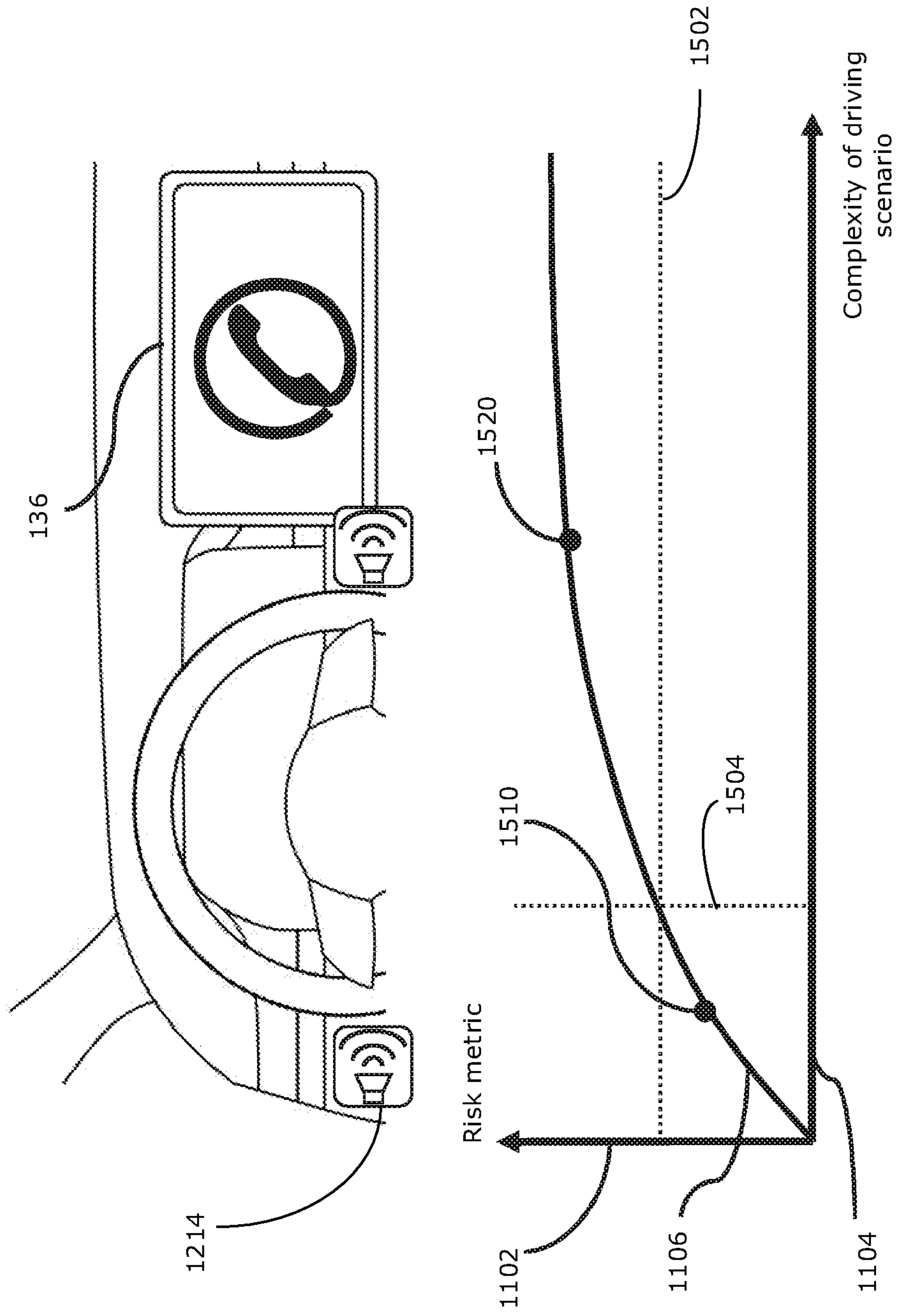
FIG. 15 illustrates an example of how a phone application may be controlled based on a risk metric, in accordance with examples of the present disclosure.

FIG. 15 illustrates another example of how a bit-based risk metric may be used to control the amount of information provided to the driver via output devices 134.

In this example, a phone application is executed by the operating system 160. The phone application may, for example, display information about an incoming call (e.g., caller ID) on the display device 136 while enabling the driver to hear the caller via the speaker 1214. The operating system 160 may automatically manage a phone call (e.g., automatically send to voicemail, put on hold, etc.) depending on the risk metric.

FIG. 15 shows the plot 1106 of risk metric (in bits) against increasing complexity of driving scenario, as previously described. Also shown is a risk threshold 1502 that represents a certain complexity level 1504 or cognitive load presented by the driving scenario. The risk threshold 1502 may be defined based on, for example, empirical testing of human drivers to determine how much cognitive load a driving scenario can present before distracted driving becomes a problem. When the risk metric is below the risk threshold 1502 (indicating lower cognitive load presented by the driving scenario), such as at point 1510, the operating system 160 may permit the driver to receive a call (e.g., audio from the call may be outputted by the speaker 1214, and call information may be displayed by the display device 136). When the risk metric is above the risk threshold 1502 (indicating higher cognitive load presented by the driving scenario), such as at point 1520, the operating system 160 may automatically block the incoming call, may automatically send the incoming call to voicemail and/or (if the driver is already engaged with the call) may automatically place the call on hold. When the risk metric later falls below the risk threshold 1502, the operating system 160 may automatically resume the call (if it was placed on hold) or may automatically playback the voicemail (if the call was sent to voicemail), for example.

In the above examples, the risk metric has been described as being used to control the output from one application. However, it should be understood that there may be multiple applications executed and providing output at the same time. In such examples, the total output provided by all executed applications may be controlled to be within an overall maximum permitted number of information bits for total outputs from all applications. For example, empirical studies may be performed to quantify the maximum number of information bits, from multiple outputs, that can be processed by a driver, in order to define the overall maximum permitted number of information bits.

Figure 16:
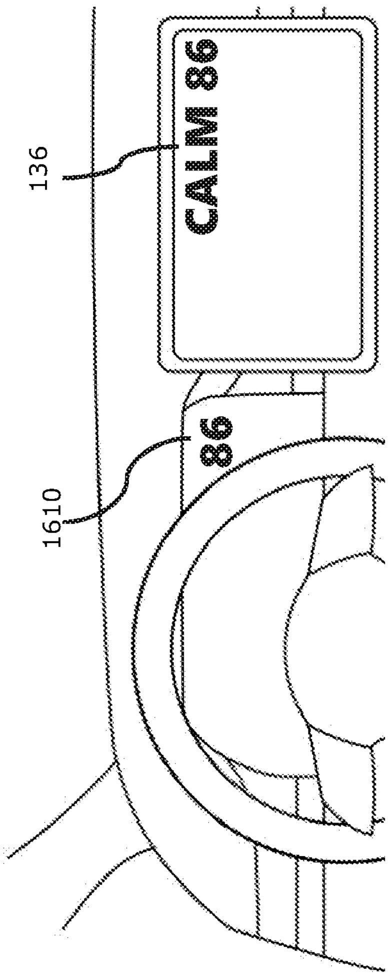
FIG. 16 illustrates an example of how a risk metric may be outputted to the driver, in accordance with examples of the present disclosure.

FIG. 16 illustrates an example of how a risk metric may be provided as feedback to the driver to inform the driver about their own cognitive state or risk-related behavior.

In this example, the real-time risk metric computed by the proxemic risk system 320 may be outputted to the driver. Instead of displaying the risk metric directly, the risk metric may be converted to a numerical score displayed on the display device 136 or on an instrument panel 1610. The numerical score may be proportional to the risk metric (such a score may be referred to as a "risk score" where the higher the score, the greater the proxemic risk) or inversely proportional to the risk metric (such a score may be referred to as a "calm score" where the higher the score, the lower the proxemic risk). The score may be a way for the driver to understand and/or improve their own driving ability, for example by encouraging the driver to achieve a higher calm score throughout their driving. In some examples, the score may be displayed when the calm score is too low (or conversely the risk score is too high) in order to provide feedback to assist the driver in improving their driving.

In some examples, the numerical score may be an aggregate score (e.g., averaged over a trip or a defined time period). In some examples, an aggregate score may be stored in a driver profile. Such information in a driver profile may be used, for example by an insurance company, to understand a driver's risk profile and may be used to lower a driver's insurance if their aggregate score indicates generally low-risk driving. Using the risk metric in this way to add information to a driver profile may enable more accurate and/or personalized evaluation of a driver's risk profile compared to conventional methods (e.g., based on the driver's age).

Figure 17:
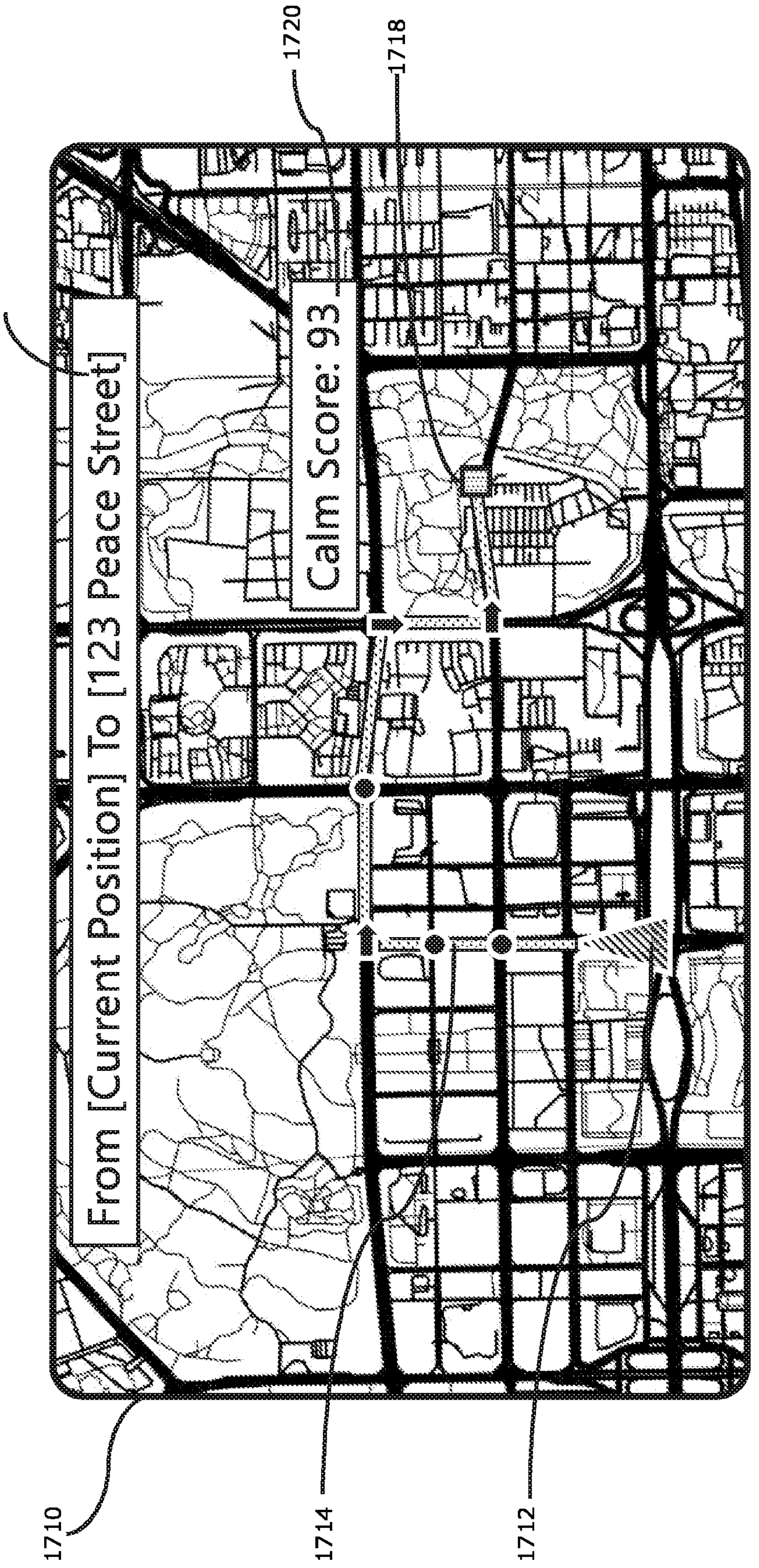
FIG. 17 illustrates an example of how risk metric may be used by a navigation application for planning a route, in accordance with examples of the present disclosure.

FIG. 17 illustrates an example of how a risk metric may be used by a navigation application to select a driving route.

In this example, the display device 136 may display a UI 1710 of a navigation application. The UI 1710 may show a map of a planned driving route (e.g., from the vehicle's current location to a planned destination) including a symbol 1712 representing the vehicle and a highlighted suggested route 1714. The address 1716 of the planned destination may be shown, and a symbol 1718 may be used to represent the planned destination on the map.

The vehicle control system 115 may, for example, have access (e.g., via a wireless transceiver 130) to a database of real-time risk metrics from other vehicles. In particular, the database of real-time risk metrics may represent the proxemic risk experienced by other vehicles navigating the roads along different possible routes to the planned destination. The navigation application may use any suitable path planning algorithm to define possible routes to the planned destination and then sort the possible routes using the risk metrics of the other vehicles along each possible route. The route having the lowest risk metrics may be ranked first and may be presented to the driver as a preferred "calm" route. The "calm score" 1720 may be displayed.

It should be understood that the examples of controlling visual and/or audio output (e.g., as described with respect to FIGS. 11-17) may be implemented in combination with the examples of controlling haptic output (e.g., as described with respect to FIGS. 4-10B). For example, in a driving scenario as illustrated in FIG. 4, if the risk metric exceeds a risk threshold (which in this example indicates a proxemic risk due to a possible collision with another vehicle ahead of the ego vehicle), haptic units in the steering wheel may be activated and additionally a visual UI displayed on a display device may be simplified (e.g., by reducing the number of UI elements). In this way, the driver is not only informed of the proxemic risk via control of haptic output, but visual distraction to the driver is also reduced via control of visual output. Other such combined control of different output devices and different output modalities are encompassed within the present disclosure.

Although some examples described above refer to a risk metric that is bit-based and that is computed using a particular definition (e.g., Equation 1), it should be understood that this is not intended to be limiting. In general, the risk metric may be computed based on overlap between a first PDF representing likely positioning of the ego vehicle and a second PDF representing likelihood related to a risk (e.g., likely positioning of another vehicle related to a collision risk, likely trajectory within a road related to avoiding risk of leaving the road, etc.) using an any suitable definition disclosed herein. The proxemic risk system 320 may select the appropriate definition to use for computing the risk metric, depending on the driving scenario. Further, the risk metric maybe represented using bits or other numerical representation and outputted by the proxemic risk system 320 to enable control of visual, audio and/or haptic output in order to convey proxemic risk to the driver.

Examples of the present disclosure may be useful for vehicles operating in fully-autonomous mode, semi-autonomous mode or fully user-controlled mode (with assisted driving). In some examples, if the vehicle 105 is in fully-autonomous or semi-autonomous mode and determines that a handover to fully user-controlled mode is needed, the vehicle 105 may perform operations to determine the real-time cognitive load of the driver (e.g., represented by the risk metric) and determine the timing for a handover accordingly. For example, if the cognitive load (represented by the risk metric) is high, the vehicle 105 may handover to user-controlled mode when proxemic risk is lower, to provide sufficient response time for mitigating the risk. On the other hand, if the cognitive load is low, the vehicle 105 may handover to user-controlled mode when proxemic risk is higher, to avoid unnecessarily disrupting the driver.

Figure 18:
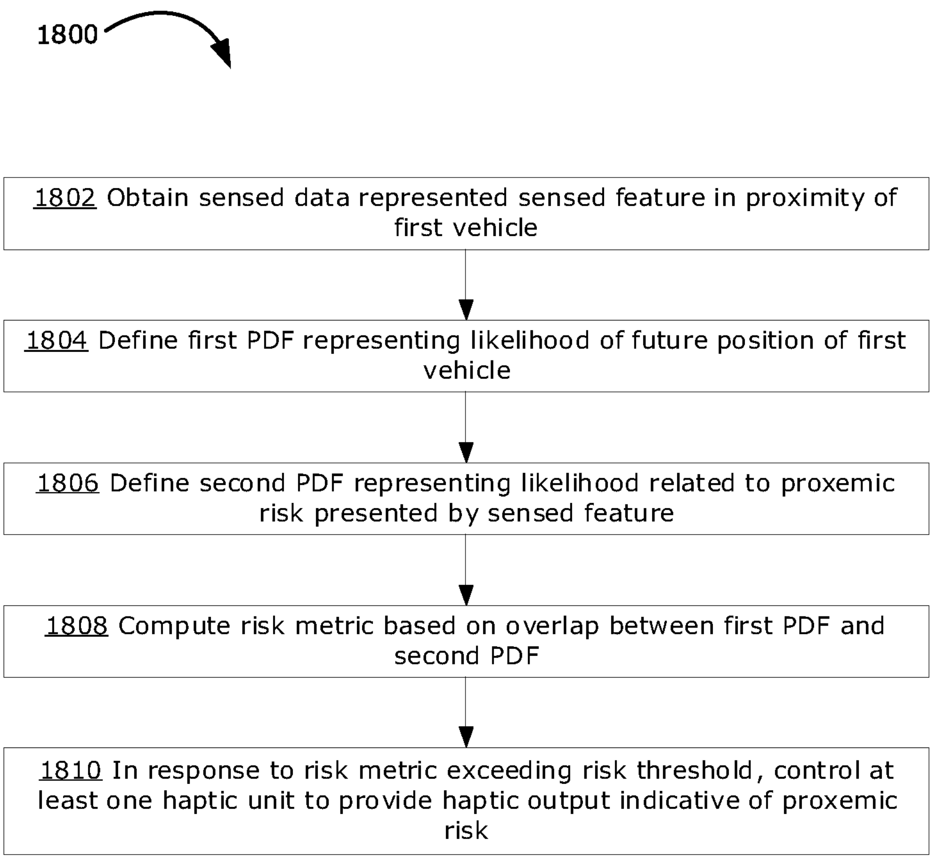
FIG. 18 is a flowchart illustrating an example method for managing output devices, including haptic output devices, in accordance with examples of the present disclosure.

FIG. 18 is a flowchart illustrating an example method 1800 for managing output devices, in particular haptic output devices, in a vehicle based on detected proxemic risk. The method 1800 may be performed by one or more processing units (e.g., processing unit(s) of the processing system 102 in the vehicle control system 115 of the vehicle 105). For example, the method 1800 may be performed by a processing unit executing instructions (e.g., instructions of the proxemic risk system 320) stored in a memory (e.g., the memory 126 of the vehicle control system 115 of the vehicle 105). In general, a processing unit may be configured to execute suitable instructions to control output devices in a vehicle, in accordance with the method 1800. The method 1800 is with respect to the ego vehicle, which may be referred to as the first vehicle in the following description.

At 1802, sensed data is obtained (e.g., from one or more environment sensors 110) representing a sensed feature in the proximity of the first vehicle. The method 1800 may be triggered by the ADAS 330 or other perception system when the sensed feature is determined to be related to a possible proxemic risk (e.g., related to a possible collision risk or a possible lane deviation risk). For example, a sensed feature may be a sensed location of another vehicle in the same lane or different lane as the first vehicle. In another example, a sensed feature may be a sensed boundary of the lane being driven by the first vehicle. Sensed data may, for example, be obtained from the camera 112, LIDAR unit 114, radar unit 116 and/or ultrasound unit 118. The sensed data may be processed by the ADAS 330 or other perception system, in order to detect the sensed feature. It should be understood that the sensed data may be continuously obtained and processed in real-time or near real-time (e.g., every 100 ms).

The ADAS 330 and/or the proxemic risk system 320 may determine a type and/or direction of proxemic risk based on the sensed feature. For example, if the sensed feature is another vehicle in the same lane as the first vehicle, the type of proxemic risk may be a risk of a collision (e.g., head-on or rear-end collision) and the direction of the proxemic risk may be from the front or rear of the first vehicle. In another example, if the sensed feature is another vehicle in an adjacent lane, the type of proxemic risk may be a risk of a collision (e.g., side collision) and the direction of the proxemic risk may be from the left or right side of the first vehicle. If the sensed feature is a lane boundary, the type of proxemic risk may be a risk of deviating from the lane and the direction of the proxemic risk may be from the side of the first vehicle.

At 1804, a first PDF is defined using the sensed data. The first PDF may be defined using sensed data collected over a defined time period (e.g., 500 ms). The first PDF represents the likelihood of a future position of the first vehicle, based on the current position of the first vehicle. For example, the first PDF may be based on the estimated safe stopping distance from the current position, as discussed above. The first PDF may be a 1D Gaussian distribution having a mean that is defined to be the estimated stopping distance of the first vehicle (relative to the current position) and a standard deviation that is defined to be the variation in speed of the first vehicle (e.g., changes in speed over a short period of time, such as 500 ms).

At 1806, a second PDF is defined using the sensed data. The second PDF may be defined using sensed data collected over a defined time period (e.g., 500 ms). The second PDF represents likelihood related to a proxemic risk presented by the sensed feature. For example, if the sensed feature is another vehicle, then the second PDF represents the likelihood of a future position of the other vehicle, which is related to the risk of collision. In another example, if the sensed feature is a lane boundary, then the second PDF represents a distribution of safe trajectories within the lane, which is related to the risk of deviating from the lane.

The second PDF may be another 1D Gaussian. The mean and standard deviation of the second PDF may be defined based on the sensed feature. For example, if the sensed feature is another vehicle, then the second PDF may have a mean defined by the sensed location of the other vehicle and a standard deviation defined by a variation in relative distance between the first vehicle and the other vehicle (e.g., changes in relative distance over a short period of time, such as 500 ms). In another example, if the sensed feature is a lane boundary, then the second PDF may have a mean defined by a midpoint of the width of the lane (which may be detected by the ADAS 330 or other perception system, or may be determined using information from a satellite receiver 132 such as GPS) and the standard deviation may be defined by the width of the lane (e.g., such that 95% of the second PDF falls within the width of the lane) or based on data about historical safe trajectories associated with the lane (e.g., from a database of trajectories traversed by drivers in the same or similar lane).

The first PDF and second PDF may be 1D probability distributions defined along the direction of the proxemic risk. For example, if the proxemic risk is from the front or rear direction (e.g., risk of a head-on or rear-end collision), then the first and second PDFs may be defined along the longitudinal direction (i.e., along the axis corresponding to the forward/backward direction relative to the first vehicle). If the proxemic risk is from the side direction (e.g., risk of deviation from a lane or risk of a left-side or right-side collision), then the first and second PDFs may be defined along the lateral direction (i.e., along the axis corresponding to the left/right direction relative to the first vehicle).

Optionally, if there are multiple sensed features representing multiple sources of proxemic risk (e.g., multiple vehicles in the proximity of the first vehicle), step 1806 may be performed repeatedly to define respective PDFs for each of the sensed features.

Optionally, if the sensed feature(s) represent proxemic risk from different directions, step 1804 may involve defining sub-PDFs of the first PDF in each direction (e.g., a longitudinal sub-PDF and a lateral sub-PDF of the first PDF). If a single sensed feature represents proxemic risk from different directions, step 1806 may involve defining sub-PDFs of the second PDF in each direction (e.g., a longitudinal sub-PDF and a lateral sub-PDF of the second PDF).

It should be understood that steps 1804 and 1806 may be performed in any order, including in parallel.

At 1808, a risk metric computed based on an overlap between the first PDF and the second PDF. The risk metric represents the likelihood of the proxemic risk related to the sensed feature (e.g., a risk of collision if the sensed feature is the location of another vehicle, or a risk of deviation from the lane if the sensed feature is the lane boundary).

If the proxemic risk is related to collision with another vehicle, the risk metric may be computed based on the area of the overlap between the first and second PDFs. If the proxemic risk is related to deviation from the lane, the risk metric may be computed based on the complement of the overlap between the first and second PDFs. In some cases, different equations may be used to compute metrics for controlling different forms of output to the driver. For example, equation 2 may be used to generate a metric useful for controlling haptic output, and equation 6 may be used to generate a metric useful for controlling a user interface. Additionally, the proxemic risk system 320 may compute different metrics in parallel, for the same driving scenario, in order to provide output for controlling different output modalities to convey proxemic risk to the driver.

If the first and second PDFs are 1D Gaussian distributions, the overlap may be computed using any suitable algorithm for computing the overlap between two Gaussian distributions in a closed-form expression. If the first PDF and/or the second PDF is a more complex (e.g., non-Gaussian) distribution, the amount of overlap may be computed using a Reimann Sum or other approximation techniques.

Optionally, if multiple PDFs have been defined to represent multiple risk sources, the risk metric may be computed by determining the total of the amount of overlaps between the first PDF and each of the multiple PDFs (i.e., the overlap between the first PDF and each PDF representing a respective risk is determined, then all the overlaps are summed together). In some examples, a respective risk metric may be computed to represent the likelihood of the proxemic risk from a respective risk source, and a combined risk metric may be computed (e.g., using summation) from the respective risk metrics.

Optionally, if the sensed feature(s) represent proxemic risk from different directions, a respective risk metric may be computed for each direction. This may be done by determining the amount of overlap between a sub-PDF of the first PDF in a given direction and a second PDF representing a proxemic risk from the given direction, and repeating this operation for each direction (e.g., for the longitudinal direction and the lateral direction). A combined risk metric may be computed by combining (e.g., summing) the risk metric computed for each direction.

At 1810, in response to the risk metric exceeding a defined risk threshold (thus indicating a likely proxemic risk), at least one haptic unit (which is embedded in the first vehicle, such as in the steering wheel or the driver's seat), is controlled to provide haptic output indicative of the likely proxemic risk.

In some examples, the risk threshold may be learned using machine learning. For example, the risk metric may be computed for various driving scenarios (which may be simulated or real-world driving scenarios) and a machine learning algorithm may be used to learn the risk threshold corresponding to a risk metric that predicts a collision or lane deviation. This learning of the risk threshold may be performed prior to actual driving activity (e.g., using simulations by the manufacturer of the vehicle or ADAS) and/or during actual driving activity (e.g., by sampling data from near collisions as previously described). The algorithm may be further updated as it continuously adapts to the driver's driving profile and risk preference.

The proxemic risk system 320 may compare the risk metric to a risk threshold that is selected based on the type of proxemic risk. For example, a risk threshold related to a collision risk may be lower than a risk threshold related to a lane deviation risk (e.g., because the collision risk may be more undesirable than the lane deviation risk).

The at least one haptic unit may be controlled to output vibrations at a frequency and/or intensity based on the magnitude of the risk metric (which may represent the intensity of the proxemic risk). In examples where there are haptic units embedded in different locations in the first vehicle (e.g., in the steering wheel and in the driver's seat, as shown in FIGS. 2A and 2B), specific haptic unit(s) may be selected to provide the haptic output to reflect the direction of the proxemic risk. For example, if the proxemic risk is from the front direction, one or more haptic units embedded in the steering wheel may be controlled to provide the haptic output. In another example, if the proxemic risk is from the rear direction, one or more haptic units embedded in the back of the driver's seat may be controlled to provide the haptic output. In another example, if the proxemic risk is from the left or right direction, one or more haptic units embedded in the left or right, respectively, of the driver's seat may be controlled to provide the haptic output. It should also be understood that various combinations of haptic units may be selected to provide the haptic output, for example to convey proxemic risk from multiple directions.

The method 1800 may be performed continuously, for example until the ADAS 330 or other perception system determines that there is no longer a sensed feature related to a possible proxemic risk. For example, if the sensed feature is another vehicle, the ADAS 330 or perception system may determine that the other vehicle has passed or moved away such that there is no longer a collision risk. In another example, if the sensed feature is a curve in the road, the ADAS 330 or perception system may determine that the first vehicle has moved past the curve and the road is now straight such that there is no longer a lane deviation risk.

It should be understood that the method 1800 may be repeatedly performed as the first vehicle navigates through a risk scenario (where a risk scenario refers to a specific proxemic risk presented by a particular environment, such as a particular occurrence of another vehicle in front or a particular curve in the road). While the method 1800 is being performed continuously during the risk scenario, the first PDF and second PDF may be continuously updated (e.g., by adjusting the mean and standard deviation) to reflect changes in the risk scenario (e.g., to reflect changes in the position or velocity of the first vehicle, changes in the position or velocity of another vehicle, changes in the curvature of the road, etc.). Accordingly, within a single risk scenario, the risk metric may be updated to reflect the current risk level, and the haptic output may be adjusted accordingly. Thus, it should be understood that the haptic output is not necessarily provided in a constant way (e.g., constant intensity and frequency) throughout a single risk scenario but may instead be adjusted in real-time or near real-time to reflect the current risk level (which may increase or decrease as the risk scenario changes). Additionally, if there are multiple haptic units in the first vehicle, the haptic unit(s) selected to provide the haptic output may change as the risk scenario changes (e.g., if another vehicle moves from an adjacent lane to in front of the first vehicle, the selected haptic unit(s) may change from haptic unit(s) located on the side of the driver's seat to haptic unit(s) located in the steering wheel).

Figure 19:
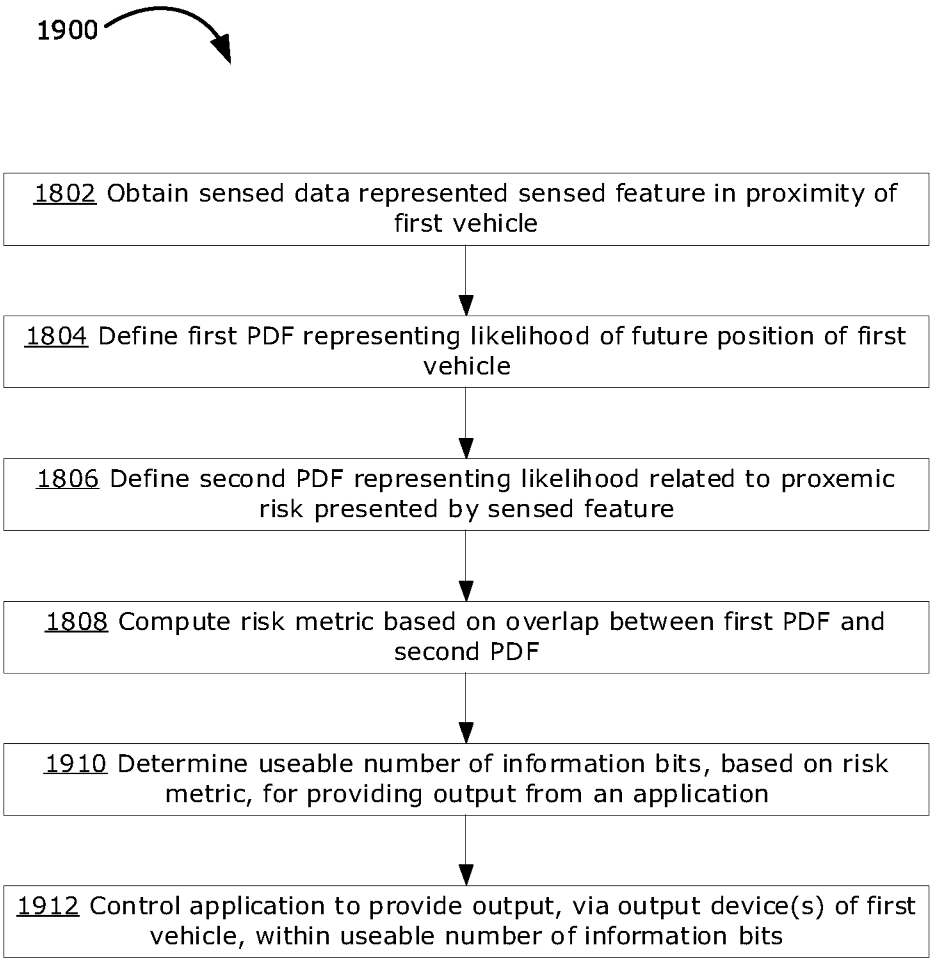
FIG. 19 is a flowchart illustrating an example method for managing output devices, including visual and audio output devices, in accordance with examples of the present disclosure.

FIG. 19 is a flowchart illustrating another example method 1900 for managing output devices in a vehicle based on detected proxemic risk. The method 1900 may be performed by one or more processing units (e.g., processing unit(s) of the processing system 102 in the vehicle control system 115 of the vehicle 105). For example, the method 1900 may be performed by a processing unit executing instructions (e.g., instructions of the proxemic risk system 320) stored in a memory (e.g., the memory 126 of the vehicle control system 115 of the vehicle 105). In general, a processing unit may be configured to execute suitable instructions to control an application that provides output via output devices in a vehicle, in accordance with the method 1900. The method 1900 is with respect to the ego vehicle, which may be referred to as the first vehicle in the following description.

The method 1900 may include steps 1802-1808 described previously. The details of steps 1802-1808 need not be repeated here. It should be understood that the method 1900 encompasses all the description of steps 1802-1808 provided above.

Optionally, the risk metric may be outputted to the driver (e.g., display visually via the display device 136). The risk metric may also be stored, for example in order to quantify the driver's risk profile.

At 1910, a useable number of information bits is determined, based on the risk metric, for providing output from an application executed by the processing unit (e.g., a processing unit of the processing system 102 of the first vehicle 105). As described above, the risk metric may be converted to binary bits, using a negative logarithmic function (e.g., using Equation 1). The useable number of information bits may be determined by subtracting the risk-based risk metric from a maximum permitted number of information bits (which may be a maximum assigned to the application or an overall maximum permitted number of information bits for total outputs from all applications).

The application may be, for example, a general UI (e.g., for managing various functions of the first vehicle), a messaging application, a map application, a music application, a phone application, etc. Some non-limiting examples have been described with respect to FIGS. 11-17.

At 1912, the application is controlled to provide output within the useable number of information bits. The application may provide output via one or more output devices of the first vehicle. The output may be provided via one or more output modalities (e.g., visual output, audio output, haptic output, etc.).

For example, if the application displays a UI (e.g., via the display device 136), the UI may be controlled to display a number of UI elements dependent on the useable number of information bits (e.g., as described with respect to FIG. 11). For example, if each UI element is considered to contribute a defined number of information bits to the output, then the UI is controlled to display a number of UI elements that together provide a total number of information bits less than or equal to the useable number of information bits.

In another example, if the application is a messaging application, the messaging application may be controlled to output a received message, via a visual output device (e.g., via the HUD 176). The received message may be displayed one word at a time or using a scrolling message, at a speed dependent on the useable number of information bits (e.g., as described with respect to FIG. 12). For example, the message may be displayed word-by-word at a per word speed that is directly proportional to the useable number of information bits (i.e., the lower the useable number of information bits, the slower the display speed).

In another example, if the application is a map application, the map application may be controlled to provide a visual map (e.g., via the display device 136) at a scale dependent on the useable number of information bits. For example, the scale of the map may be adjusted to display more detail (e.g., zoomed out view of the map) when the useable number of information bits is high, and may be adjusted to display less detail (e.g., zoomed in view of the map) when the useable number of information bits is low.

In another example, if the application is a music application, the music application may be controlled to output music (e.g., via the speaker 1214) at a volume dependent on the useable number of information bits. For example, the maximum permitted audio volume may be automatically adjusted directly proportional to the useable number of information bits. In some examples, other information may be provided by the music application (e.g., song title, playtime, etc.) via another output modality (e.g., via the display device 136). This other information may also be adjusted dependent on the useable number of information bits.

In another example, if the application is a phone application, the phone application may be controlled to permit or block a call dependent on the useable number of information bits. For example, if the useable number of information bits is lower than a minimum threshold, the phone application may automatically place a current call on hold or may automatically block any incoming calls. The phone application may automatically resume the call that was put on hold or may permit incoming calls again when the useable number of information bits rises past the minimum threshold.

The outputs from two or more different applications may be controlled together, and the useable number of information bits may be shared among the two or more applications. If the useable number of information bits is low such that the output that can be provided by the two or more different applications is limited, then output from a higher priority application may take precedence over output from a lower priority application. For example, a map application may have higher priority than a music application, such that if the useable number of information bits is low then the music application may be muted so that more information bits can be used for providing output from the map application.

Similar to the method 1800, the method 1900 may be performed continuously, for example until the ADAS 330 or other perception system determines that there is no longer a sensed feature related to a possible proxemic risk. Output from one or more applications may be continuously adjusted, based on the useable number of information bits (after subtracting the bit-based risk metric from the maximum permitted number of information bits), until the proxemic risk has passed.

In some examples, if the risk metric is too high (e.g., exceeds a risk threshold) or if the useable number of information bits is too low (e.g., falls below a minimum threshold), then the output provided by the application(s) may be restricted to only a particular modality (e.g., only audio output; only visual output; only haptic output), restricted to only a particular output device (e.g., only output via the display device 136 and not via the HUD 176) or outputs from any application may be prohibited, in order to decrease the cognitive load on the driver.

In some examples, a risk metric that is computed may be stored in a driver profile. For example, the risk metric may be computed and aggregated (e.g., averaged) over a route. The risk metric may then be stored in a driver profile maintained in a memory of the first vehicle and/or communicated to a remote database. For example, the risk metric may be stored in a remote database that stores risk metrics associated with other drivers of other vehicles.

A database of risk metrics associated with different drivers may be used for route planning. For example, a navigation application executed by the first vehicle may generate a possible route to a planned destination. The remote database may be queried to obtain risk metrics associated with other vehicles along the possible route, in order to compute a risk metric associated with the possible route (e.g., by averaging the risk metrics of other vehicles along the possible route). Then the risk metric may be used to rank the possible route among other possible routes and/or the risk metric may be displayed together with the possible route.

It should be understood that the method 1800 and the method 1900 may be performed together. That is, the proxemic risk may be conveyed to the driver via haptic output (e.g., using the method 1800) together with adjusting the output provided based on the proxemic risk (e.g., using the method 1900). In this way, the driver may be informed of the proxemic risk in an intuitive manner via haptic output and at the same time the cognitive load placed on the driver by output devices may be decreased to enable the driver to adequately respond to the proxemic risk.

In various examples, the present disclosure describes the use of PDFs and overlaps between PDFs to represent a probability of a proxemic risk, including a probability of collision (e.g., with other cars or obstacles) or a probability of deviating from the lane. The disclosed methods and systems may make use of sensors already commonly found in vehicles, such as GPS systems, radar units and cameras. The computation and assessment of risk may be relatively simple mathematically, which may enable practical application for real-time risk assessment. Additionally, the disclosed methods and systems may be adaptable and flexible to various driving and risk scenarios.

The risk metric may be computed using a function disclosed herein that represents the amount of surprise experienced by the driver. The function may be exponential, such that smaller risks need not be conveyed to the driver. The disclosed function is computable, commutative, associative and distributive. This means that various risks can be summed in any order to compute an overall risk (e.g., along a particular direction).

Examples of the present disclosure enable risk information to be conveyed to a driver in an intuitive and unobtrusive way, using haptic outputs.

Examples of the present disclosure may use a bit-based risk metric as a way of quantifying the cognitive load placed on the driver by proxemic risks in the environment. The risk metric may be a quantification of the surprise (or cognitive load) in a driving scenario, based on SNR or KL-divergence, for example using the equations disclosed herein.

By using the risk metric as a quantification of the cognitive load of the driver, user interfaces and outputs to the driver may be dynamically adapted to the risk scenario, to reduce driver distraction. The risk metric may also be used as a quantification of the driver's risk profile.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method, at a processing unit of a first vehicle, the method comprising:

obtaining, from one or more sensors, data representing a sensed position of the first vehicle and a sensed feature in a proximity of the first vehicle, wherein the first vehicle is moving within a lane and the sensed feature is a sensed boundary of the lane;

defining a first probability density function (PDF) based on the obtained data, the first PDF representing likelihood of a future position of the first vehicle;

defining a second PDF based on the obtained data, the second PDF representing a distribution of safe trajectories within the lane, the second PDF being a 1D Gaussian distribution having a mean defined by a midpoint of a width of the lane;

computing a risk metric representing a likelihood of the proxemic risk to the first vehicle based on a complement of an overlap between the first PDF and the second PDF;

determining a useable number of information bits, based on the risk metric, representing an amount of information safely processable by a driver of the first vehicle; and controlling an application, executed by the processing unit, to provide output, via one or more output devices of the first vehicle, within the useable number of information bits.

2. The method of claim 1, wherein the first PDF is a 1D Gaussian distribution having a mean defined by an estimated stopping distance of the first vehicle and a standard deviation defined by a variation in speed of the first vehicle.

3. The method of claim 1, wherein the standard deviation of the second PDF is defined based on data about historical safe trajectories associated with the lane.

4. The method of claim 1, wherein the risk metric is computed using a binary logarithm and the risk metric is represented using bits.

5. The method of claim 4, wherein the useable number of information bits is determined by subtracting the risk metric in bits from a maximum permitted number of information bits assigned to the application.

6. The method of claim 1, wherein a user interface of the application is outputted by a display device of the first vehicle, and wherein the user interface is controlled to display a number of user interface elements dependent on the useable number of information bits.

7. The method of claim 1, wherein the application is a messaging application, wherein the messaging application is controlled to output a received message, via a visual output device of the first vehicle, at a speed dependent on the useable number of information bits.

8. The method of claim 1, wherein the application is a map application, wherein the map application is controlled to provide a visual map at a scale dependent on the useable number of information bits.

9. The method of claim 1, wherein the application is a music application, wherein the music application is controlled to output music at a volume dependent on the useable number of information bits.

10. The method of claim 1, wherein the application is a phone application, wherein the phone application is controlled to permit or block a call dependent on the useable number of information bits.

11. The method of claim 1, further comprising:

outputting the risk metric via at least one of the one or more output devices.

12. The method of claim 1, further comprising:

storing the risk metric in a driver profile.

13. The method of claim 1, further comprising:

using a navigation application to generate a possible route to a planned destination;

communicating with a database storing risk metrics associated with other vehicles along the possible route;

computing a risk metric associated with the possible route, using the risk metrics associated with other vehicles along the possible route; and displaying the possible route together with the risk metric associated with the possible route.

14. The method of claim 1, wherein the one or more sensors include at least one of: a camera unit, a radar unit, a global navigation satellite system (GNSS) unit, a LIDAR unit or an ultrasound unit.

15. The method of claim 1, wherein the application is restricted to providing output using only a designated output device when the risk metric exceeds a risk threshold or when the useable number of information bits falls below a minimum threshold.

16. The method of claim 1, wherein the application is prohibited from providing any output via the one or more output devices when the risk metric exceeds a risk threshold or when the useable number of information bits falls below a minimum threshold.

17. An electronic device of a first vehicle, the electronic device comprising:

a processing unit; and a memory including instructions that, when executed by the processing unit, cause the electronic device to:

obtain, from one or more sensors, data representing a sensed position of the first vehicle and a sensed feature in a proximity of the first vehicle, wherein the first vehicle is moving within a lane and the sensed feature is a sensed boundary of the lane;

define a first probability density function (PDF) based on the obtained data, the first PDF representing likelihood of a future position of the first vehicle;

define a second PDF based on the obtained data, the second PDF representing a distribution of safe trajectories within the lane, the second PDF being a 1D Gaussian distribution having a mean defined by a midpoint of a width of the lane;

compute a risk metric representing a likelihood of the proxemic risk to the first vehicle based on a complement of an overlap between the first PDF and the second PDF;

determine a useable number of information bits, based on the risk metric, representing an amount of information safely processable by a driver of the first vehicle; and control an application, executed by the processing unit, to provide output, via one or more output devices of the first vehicle, within the useable number of information bits.

18. The electronic device of claim 17, wherein a user interface of the application is outputted by a display device of the first vehicle, and wherein the user interface is controlled to display a number of user interface elements dependent on the useable number of information bits.

19. The electronic device of claim 17, wherein the application is prohibited from providing any output via the one or more output devices when the risk metric exceeds a risk threshold or when the useable number of information bits falls below a minimum threshold.

20. A non-transitory computer readable medium having machine-executable instructions stored thereon, wherein the instructions, when executed by an electronic device of a first vehicle, cause the electronic device to:

obtain, from one or more sensors, data representing a sensed position of the first vehicle and a sensed feature in a proximity of the first vehicle, wherein the first vehicle is moving within a lane and the sensed feature is a sensed boundary of the lane;

define a first probability density function (PDF) based on the obtained data, the first PDF representing likelihood of a future position of the first vehicle;

define a second PDF based on the obtained data, the second PDF representing a distribution of safe trajectories within the lane, the second PDF being a 1D Gaussian distribution having a mean defined by a midpoint of a width of the lane;

compute a risk metric representing a likelihood of the proxemic risk to the first vehicle based on a complement of an overlap between the first PDF and the second PDF;

determine a useable number of information bits, based on the risk metric, representing an amount of information safely processable by a driver of the first vehicle; and control an application, executed by the processing unit, to provide output, via one or more output devices of the first vehicle, within the useable number of information bits.

* * * * *